United States Patent
Black et al.

(10) Patent No.: US 12,553,357 B2
(45) Date of Patent: Feb. 17, 2026

(54) SENSING SYSTEM FOR DETECTING RUBS EVENTS OR WEAR OF AN ABRADABLE COATING IN TURBO MACHINERY

(71) Applicant: Lord Corporation, Cary, NC (US)

(72) Inventors: Paul R. Black, Apex, NC (US); Victor Zaccardo, Durham, NC (US); Russell Altieri, Holly Springs, NC (US); Lee Wakefield, Cary, NC (US)

(73) Assignee: LORD Corporation, Cleveland, OH (US)

( * ) Notice: Subject to any disclaimer, the term of this patent is extended or adjusted under 35 U.S.C. 154(b) by 0 days.

(21) Appl. No.: 18/269,669

(22) PCT Filed: Dec. 22, 2021

(86) PCT No.: PCT/US2021/064791
§ 371 (c)(1),
(2) Date: Jun. 26, 2023

(87) PCT Pub. No.: WO2022/146807
PCT Pub. Date: Jul. 7, 2022

(65) Prior Publication Data
US 2024/0060423 A1    Feb. 22, 2024

Related U.S. Application Data

(60) Provisional application No. 63/132,531, filed on Dec. 31, 2020.

(51) Int. Cl.
*F01D 11/12* (2006.01)
*F01D 21/00* (2006.01)

(52) U.S. Cl.
CPC .......... *F01D 11/122* (2013.01); *F01D 21/003* (2013.01); *F05D 2260/80* (2013.01)

(58) Field of Classification Search
CPC ... F01D 11/122; F01D 21/003; F05D 2260/80
See application file for complete search history.

(56) References Cited

U.S. PATENT DOCUMENTS

| | | |
|---|---|---|
| 3,675,197 A | 7/1972 | Bennett et al. |
| 9,316,278 B2 | 4/2016 | Moore et al. |
| 9,939,247 B1 | 4/2018 | Dardona et al. |
| 2010/0242293 A1 | 9/2010 | Willett et al. |
| 2019/0186285 A1 | 6/2019 | Warren et al. |
| 2022/0268171 A1* | 8/2022 | Altieri ............... G01B 7/14 |

* cited by examiner

*Primary Examiner* — Aaron R Eastman
(74) *Attorney, Agent, or Firm* — McAfee & Taft, P.C.

(57) ABSTRACT

A sensing system and method for detecting wear of an abradable layer on a stationary engine casing is provided. The system is capable of measuring the abradable thickness of the abradable layer by embedding abradable sensor in the abradable layer and measuring the changing electrical properties as the abradable sensor wears.

15 Claims, 18 Drawing Sheets

SENSING SYSTEM FOR DETECTING RUBS EVENTS OR WEAR OF AN ABRADABLE COATING IN TURBO MACHINERY

CROSS-REFERENCE TO RELATED APPLICATION

The present application claims the benefit of U.S. Provisional Patent Application Ser. No. 63/132,531, filed on Dec. 31, 2020, and entitled "SENSING SYSTEM FOR DETECTING WEAR OF AN ABRADABLE COATING IN TURBO MACHINERY," the disclosure of which is incorporated herein by reference in its entirety.

FIELD OF INVENTION/BACKGROUND

The subject matter described in this specification relates to methods and systems for detecting rubs events or the wear of an abradable layer on a stationary engine casing in a rotating machine such as a gas turbine engine.

BACKGROUND

Blade tip clearance is defined as the distance or gap between the blade tip and the engine casing. This blade tip clearance is important since it affects the efficiency, stability, and safety of the turbine engine. It is known to those having skill in the art that detecting and managing the clearance between the blade tip and the engine casing is important in providing efficient and safe operation of the engine.

Various approaches to sensing blade tip clearance have been proposed such as eddy current, microwave, capacitance, and optical sensors. Each technology has its merits and disadvantages. However, to date there is no widely accepted in-service blade tip clearance monitoring technology.

Additionally, many engine systems have an abradable layer on the stationary engine casing to avoid damaging the blades or blade tips when a rub event occurs. A major complication with current blade tip clearance monitoring sensors is that they ignore wear of the abradable layer. Wear on the abradable layer is due to rub events or erosion that happens over the life of the engine. Since the gap of interest is between the blade tip and the outer surface of the abradable layer, quantifying the thickness of the abradable layer is a previously unsolved, but important aspect in determining the blade tip clearance.

The present invention provides a means to directly sense abradable wear continuously or in discrete steps with adequate resolution. The present invention may also be used to detect rub events that may occur. Such rub detection may be used to determine a known gap condition. In the case where the sensor is flush with the engine case, zero gap condition would be obtained. Such gap information may be beneficial in calibrating other engine sensing or control systems. The present invention also describes temperature compensation and redundancy. Other benefits such as robustness and manufacturability are also described within the detailed description of this invention.

SUMMARY OF THE INVENTION

In one aspect, a sensing system for detecting blade rubs or rubs of other nature and wear of an abradable layer on a stationary engine casing is provided. The sensing system comprises an abradable sensor. The abradable rub sensor is mounted in the engine case, wherein in the sensor abrades when contacted by a blade tip or erodes due to at least one environmental condition. The abradable sensor further comprises at least one electrically conductive abradable layer, at least one non-electrically conductive abradable layer, and at least one pair of electrical leads capable of providing an electrical signal to and from the abradable sensor.

In another aspect, a sensing system for detecting blade rubs or wear of an abradable layer on a stationary engine casing is provided. The sensing system comprises an abradable sensor and a sensor conditioning unit. The abradable sensor is mounted in the engine case, wherein in the sensor abrades when contacted by a blade tip or erodes due to at least one environmental condition. The abradable sensor further comprises at least one electrically conductive abradable layer, at least one non-electrically conductive abradable layer, and at least one pair of electrical leads capable of providing an electrical signal to and from the abradable sensor. The sensor conditioning unit is in electrical communication with the abradable sensor.

In still another aspect, a method of detecting blade rubs or wear of an abradable layer on a stationary engine casing is provided. The method comprises providing a sensing system, transmitting an electrical signal between the sensor conditioning unit and the sensing abradable sensor, measuring one of a resistance, a capacitance, or a round-trip time of flight for a reflected electrical signal, and correlating the measured resistance, capacitance, or time of flight for the reflected electrical signal against a known initial measurement. The sensing system further comprises an abradable sensor and a sensor conditioning unit. The abradable sensor is embedded in the abradable layer, wherein in the sensor abrades when contacted by a blade tip or erodes due to at least one environmental condition. The abradable sensor further comprises at least one electrically conductive abradable layer, at least one non-electrically conductive abradable layer, and at least one pair of electrical leads capable of providing an electrical signal to and from the abradable sensor. The sensor conditioning unit is in electrical communication with the abradable sensor.

DETAILED DESCRIPTION

Embodiments of this invention use one or more abradable sensors that are embedded within the engine case or the abradable layer of a stationary engine casing to measure blade rubs or the abradable thickness of the abradable layer. As the abradable layer wears through contact by the blades or erosion, the sensor also will wear. The wear of the sensor alters specific electrical properties of the sensor which is detectable by a sensor conditioning unit. The sensor conditioning unit senses changes in the electrical properties of the sensors that are directly related to the wear of an abradable sensor. The sensor elements are constructed of materials that allow them to survive the environment in which they are placed.

The abradable sensor has four basic components: a non-electrically conductive abradable substrate, one or more electrically conductive abradable layers or patterns that form the sensor, a non-conductive abradable encapsulant for protecting the sensor, and electrical contacts for communication with the sensor conditioning unit.

As disclosed herein, the embodiments of this invention measure different electrical properties such as resistance, capacitance, or time of flight of an electrical signal.

Figure 1:
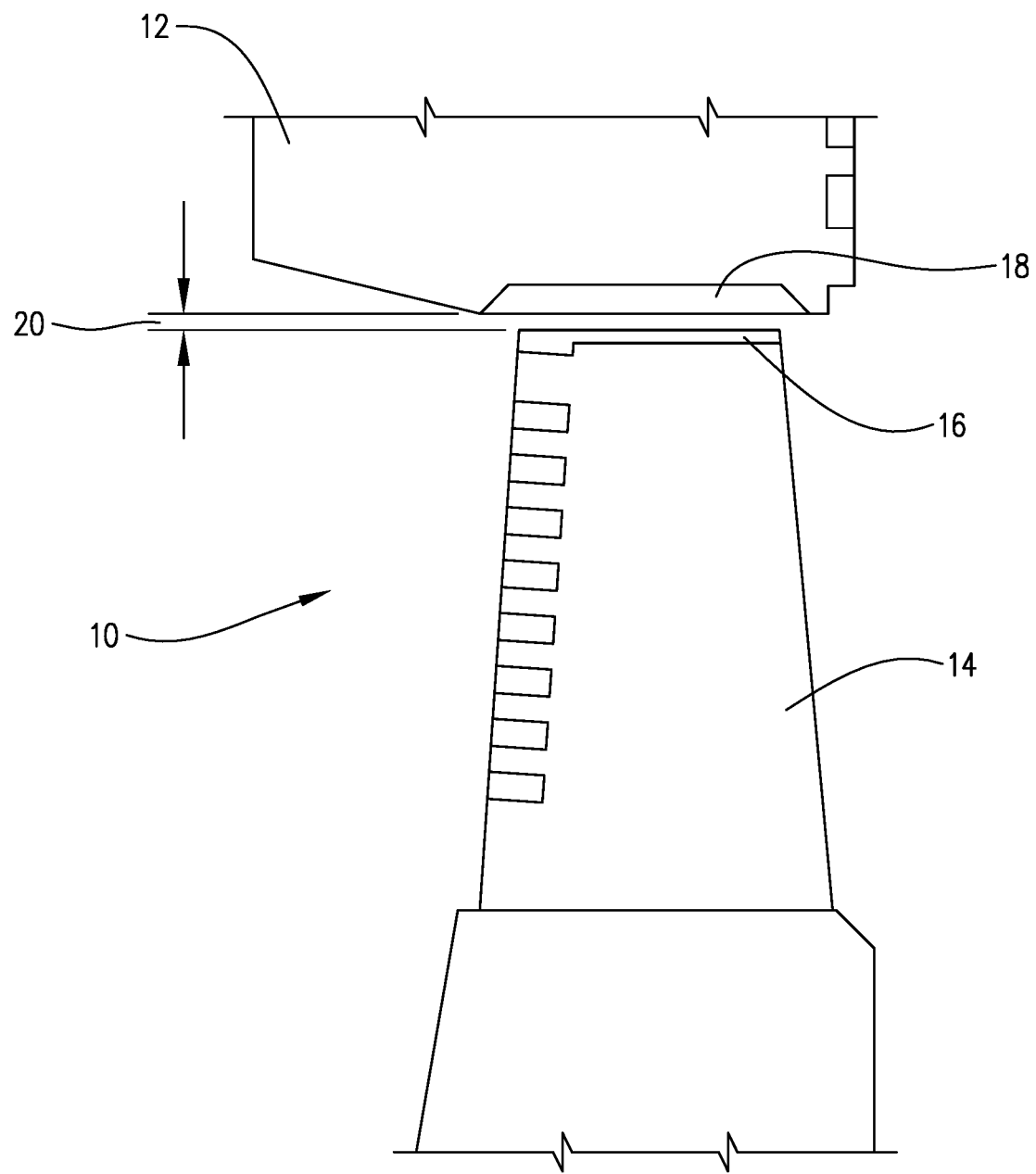
FIG. 1 illustrates a cross-section view of a high-pressure turbine stage showing a turbine blade, the abradable layer, and the blade tip clearance.

FIG. 1 shows an exemplary high-pressure turbine section 10 with a turbine blade from a gas turbine engine (not shown). The turbine section 10 includes a stationary engine casing 12 and a rotating portion. In this example, the rotating portion is a turbine blade 14 or compressor blade 14, which is part of the rotating portion. To simplify this description, the turbine blade 14 or compressor blade 14 may be referred as blade 14. As hot compressed air flows through the engine (not shown), it causes the engine (now shown) to spin. As the blades 14 spin, they grow under load. Additionally, thermal growth and vibration affect the blade tip 16 clearance depicted in FIG. 1. If the blade tip 16 contacts the stationary engine casing 12, which may be referred to as engine casing 12, it will rub the abradable layer 18. The distance between the blade tip 16 and the engine casing 12 or abradable layer 18 is the blade tip clearance 20.

The abradable layer 18 is a thermally insulating material with unique material properties that allow it to withstand the corrosive high temperature environment and provide good abradable properties. As used herein, high temperature means temperatures in excess of about 600° F. (about 315° C.), in some cases in excess of about 2000° F. (about 1100° C.), and in other cases between about 2000° F. (about 1100° C.) and about 3000° F. (about 1650° C.). The abradable layer 18 must be soft enough to abrade when the blade tip 16 makes contact but not too soft to erode excessively under normal operation. Thus, the abradable sensor 26 is capable of operating in temperatures greater than or equal to at least about 600° F. (at least about 315° C.), and in some cases capable of operating in temperatures greater than or equal to at least about 2000° F. (at least about 1100° C.). Additionally, the abradable sensor is constructed to have similar abradable and wear properties as the abradable layer. Abradable sensor 26 provides the capability to determine blade rubs and wear of abradable layer 18 anytime the engine is operating independent of current temperature conditions.

Figure 2:
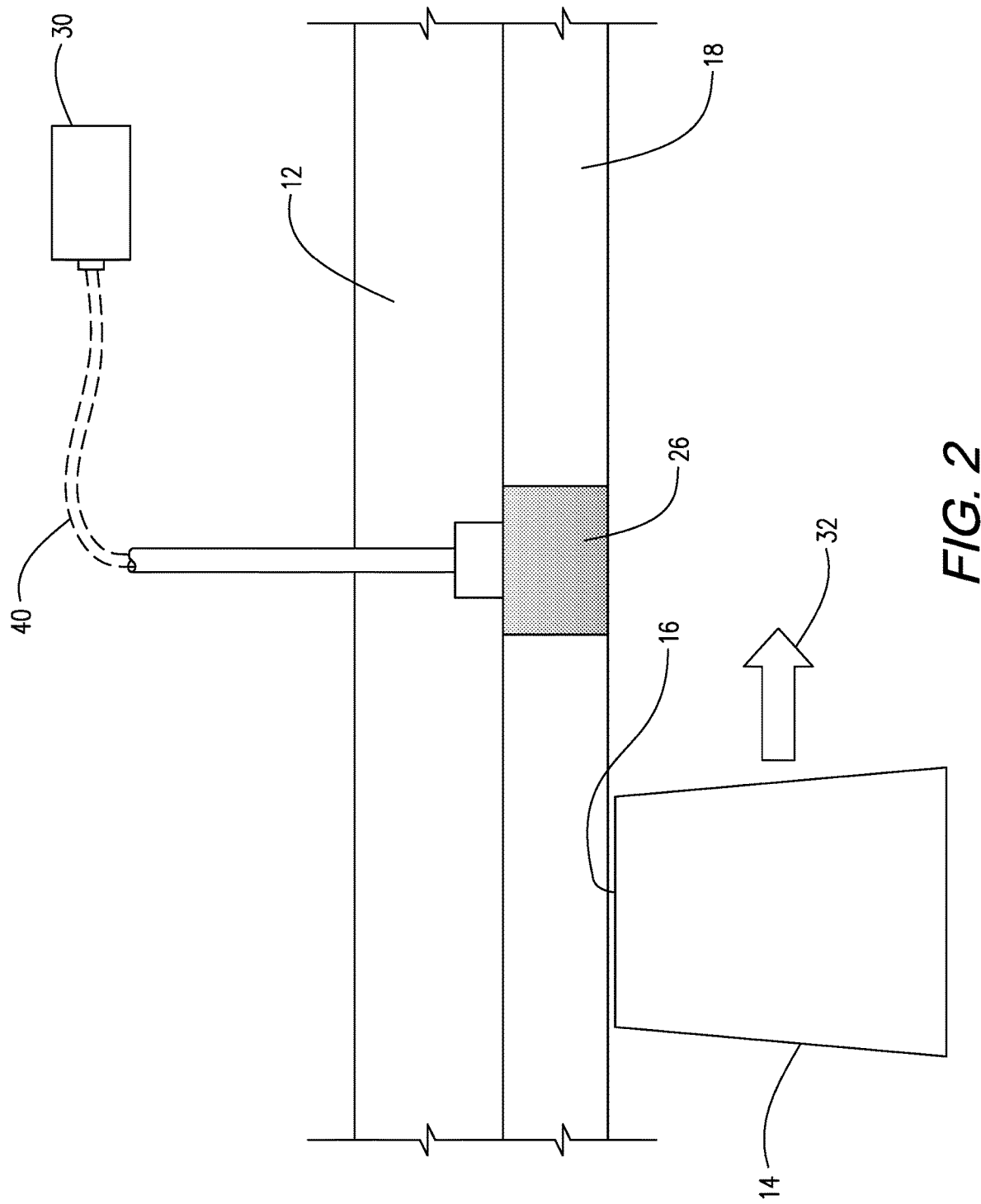
FIG. 2 illustrates a simplified cross-section view of a turbine blade, engine case, abradable layer, and a representative abradable sensor.

FIG. 2 shows a simplified sectional view of a single stage of a compressor or turbine section of a gas turbine engine. In this view, the blade 14 is proximate to the engine casing 12 with an abradable layer 18. Embedded in the engine casing 12 and within the abradable layer 18 is an abradable sensor 26. The abradable sensor 26 has at least one or more electrically conductive abradable layers 22 and at least one or more non-electrically conductive abradable substrates 24 or layers 24. The abradable sensor 26 has electrical contacts 28 (not illustrated in FIG. 2), which provide a connection to a sensor conditioning unit 30 with at least one pair of electrical leads 40. The at least one pair of electrical leads 40 can be two or more electrically conductive wires that are bundled together or run separately and are capable of providing electrical signals between the sensor conditioning unit 30 and the abradable sensor 26 through the electrical contacts 28. As will be demonstrated, there are several embodiments for the abradable sensor 26. The blade 14 is rotating in direction 32.

The sensing system 33 at least includes the abradable sensor 26, the electrical leads 40, and the sensor condition unit 30.

The sensor conditioning unit 30 is capable of detecting at least one change in electrical properties such as a change in resistance or capacitance in abradable sensor 26. Additionally, sensor conditioning unit 30 could be capable of detecting a time of flight for a reflected electrical signal within the abradable sensor 26. All of these are discussed in further detail below. Although not illustrated, the sensor conditioning unit 30 may also be in electronic communication with an engine controller or a blade clearance control unit provided by an engine manufacturer.

The electrical signals between the abradable sensor 26 and the sensor condition unit 30 provide for the abradable sensor 26 to communicate an electric signal to the sensor conditioning unit 30 that indicates a measurable change in resistance or capacitance within the abradable sensor 26. Similarly, the electrical signals between the abradable sensor 26 and the sensor condition unit 30 provide for the abradable sensor 26 to communicate an electric signal to the sensor conditioning unit 30 that indicates a time of flight for a reflected electrical signal within the abradable sensor 26.

While both FIG. 2 show the abradable sensor 26 flush with the abradable layer 18, in some applications the abradable sensor 26 may stick out past the abradable layer 18. In cases where an abradable layer 18 is not present, the abradable sensor 26 may stick out just past the engine casing 12.

Figure 3:
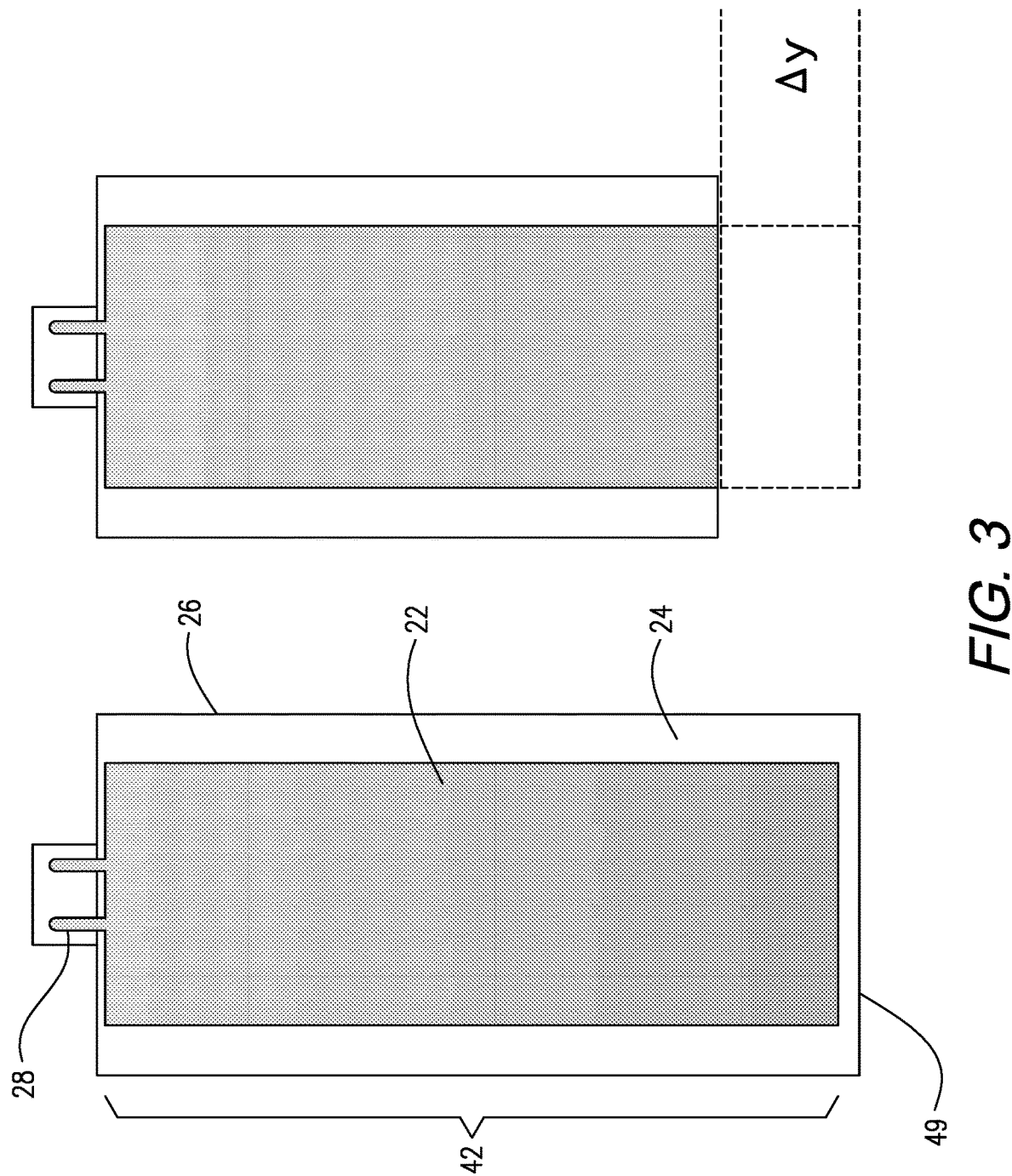
FIG. 3 illustrates an abradable sensor embodiment with a single abradable resistive layer.

Referring now to FIG. 3, a cross-sectional view of the abradable sensor 26 is illustrated. In this view, a single electrically conductive abradable layer 22 is depicted. The electrically conductive abradable layer 22 is deposited onto a single non-electrically conductive abradable substrate 24 or layer 24 with a protective non-electrically conductive abradable material encapsulating it.

As depicted in the image on the right-hand side of FIG. 3, the electrical properties of the abradable sensor 26 change as the abradable sensor 26 wears. Namely, the electrical resistance of the abradable sensor 26 increases as the thickness (y) of the electrically conductive abradable layer 22 decreases. Consequently, a change in resistance ΔR can be correlated to a change Δy in the abradable sensor thickness 42.

FIG. 3 shows the electrically conductive abradable layer 22 as a flat rectangular area. However, such an electrically conductive abradable layer 22 could be formed with many different shapes: trapezoidal, triangular, or parabolic. Furthermore, the electrically conductive abradable layer 22 also does not need to be flat. It could be cylindrical or a cube shape. The shape of the of the electrically conductive layer 22 should be selected based on sensor integration, manufacturability, and sensor performance. For example, a shape that is wider with less thickness (y), will have a higher sensitivity (ΔR/Δy).

FIGS. 2, 4, and 6-9, illustrate that the electrically conductive abradable layer 22 has one pair of electrical leads 40 that are in communication with the sensor conditioning unit 30. As illustrated, the sensor conditioning unit 30 is positioned away from the abradable sensor 26 to provide improved environmental conditions and temperature regulation. However, having sensor conditioning unit 30 positioned near or proximate abradable sensor 26 is an option as long as it is thermally protected to operate in the environment.

Figure 4:
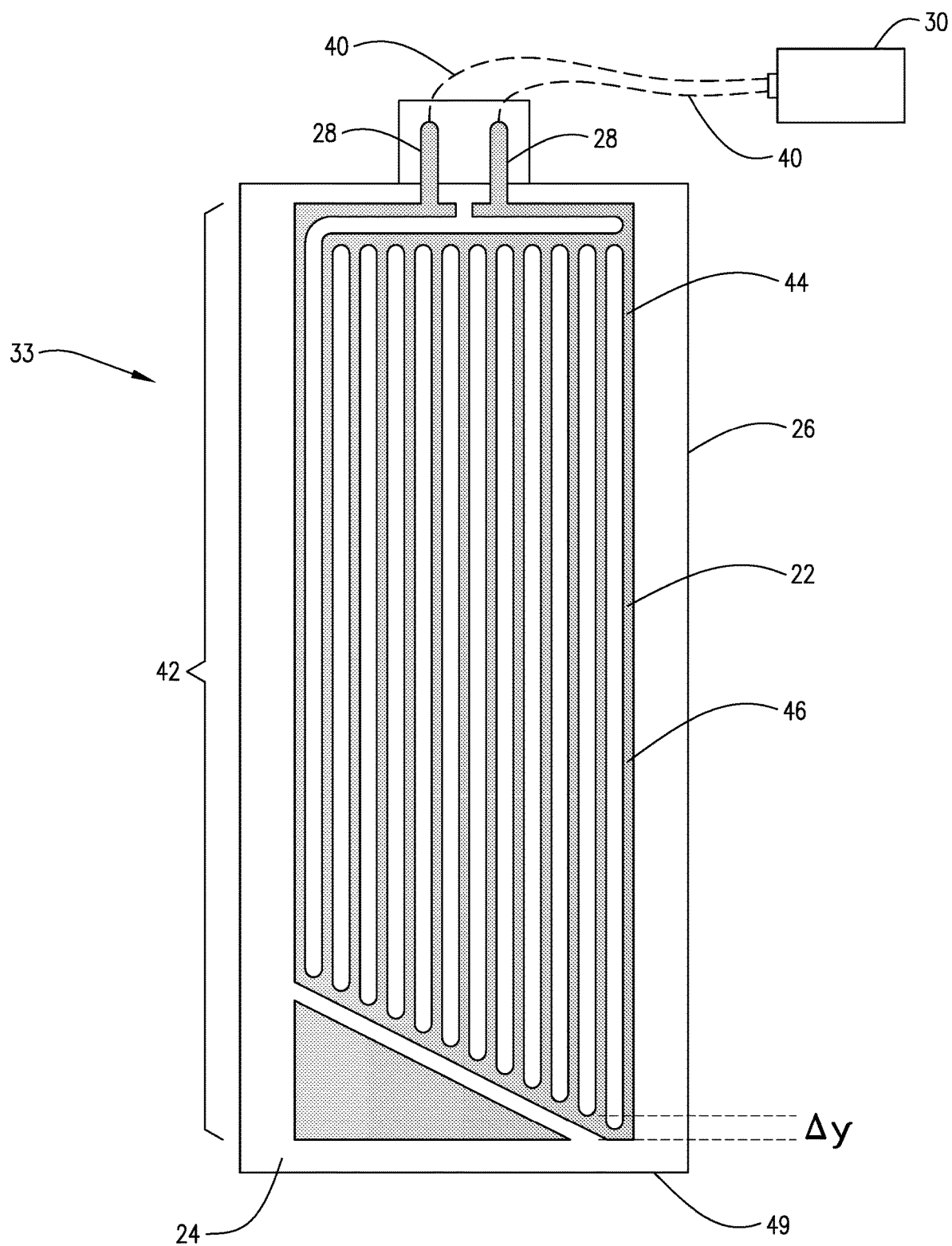
FIG. 4 illustrates an abradable sensor embodiment with an abradable resistive loop consisting of a pattern of parallel resistive loops on a single layer.

FIG. 4 illustrates a similar embodiment to FIG. 3 with a single electrically conductive abradable layer 22. In this case, the electrically conductive abradable layer 22 has a distinct pattern 44. Such a pattern 44 can be created by applying a layer of conductive abradable material to a non-electrically conductive substrate 24 or layer 24 and etching or laser trimming the pattern 44. Alternatively, the pattern 44 could be printed directly onto the substrate. As used herein, pattern 44 includes any geometric shape with at least one electrically conductive layer 22 on a non-electrically conductive substrate 24 or layer 24, and pattern 44 may include resistive loops 46.

The pattern 44 of electrically conductive abradable layer 22 material is formed such that it has a plurality of resistive loops 46 that are electrically conductive. The plurality of resistive loop 46 are illustrated as being side-by-side. These resistive loops 46 can form a plurality of parallel resistive loops 46 that combine to produce an equivalent resistance ($R_{eq}$) as described in the equation below. Where $R_1$, $R_2$, ... $R_n$ represent the resistance of each respective parallel resistive loop 46.

$$R_{eq} = \frac{1}{\frac{1}{R_1} + \frac{1}{R_2} + \cdots + \frac{1}{R_n}}$$ Eq. 1

As the abradable sensor 26 wears with the abradable layer 18, the parallel resistive loops 46 are removed from the circuit and the resistance increases. Each parallel resistive loop 46 is positioned an incremental distance away from the end 49 of the abradable sensor 26. In the non-limiting exemplary configuration of FIG. 4, the distance is about ±1 mils (about ±25.4 micrometers) to ±about 5 mils (about ±0.127 millimeters) in a range between about 5 mils (about 0.127 millimeters) to about 50 mils (about 1.27 millimeters) of the abradable sensor 26. In another exemplary configuration, each parallel resistive loop 46 is positioned an incremental distance away from the end 49 of the abradable sensor 26, wherein the distance is about ±1 mils (about ±25.4 micrometers) to ±about 5 mils (about ±0.127 millimeters) in a range between about 10 mils (about 0.254 millimeters) to about 40 mils (about 1.016 millimeters) of the abradable sensor 26. In yet another exemplary configuration, each parallel resistive loop 46 positioned an incremental distance away from the end 49 of the abradable sensor 26 by a distance of about ±0.25 mils (about ±6.35 micrometers) to ±about 1 mil (about ±25.4 micrometers). In all these configurations, a relationship between equivalent resistance and abradable thickness 42 is created. It may be desirable to position the plurality of parallel resistive loops 46 closer together in at least one region of the abradable sensor 26 than at least one other region of the abradable sensor 26.

Figure 5:
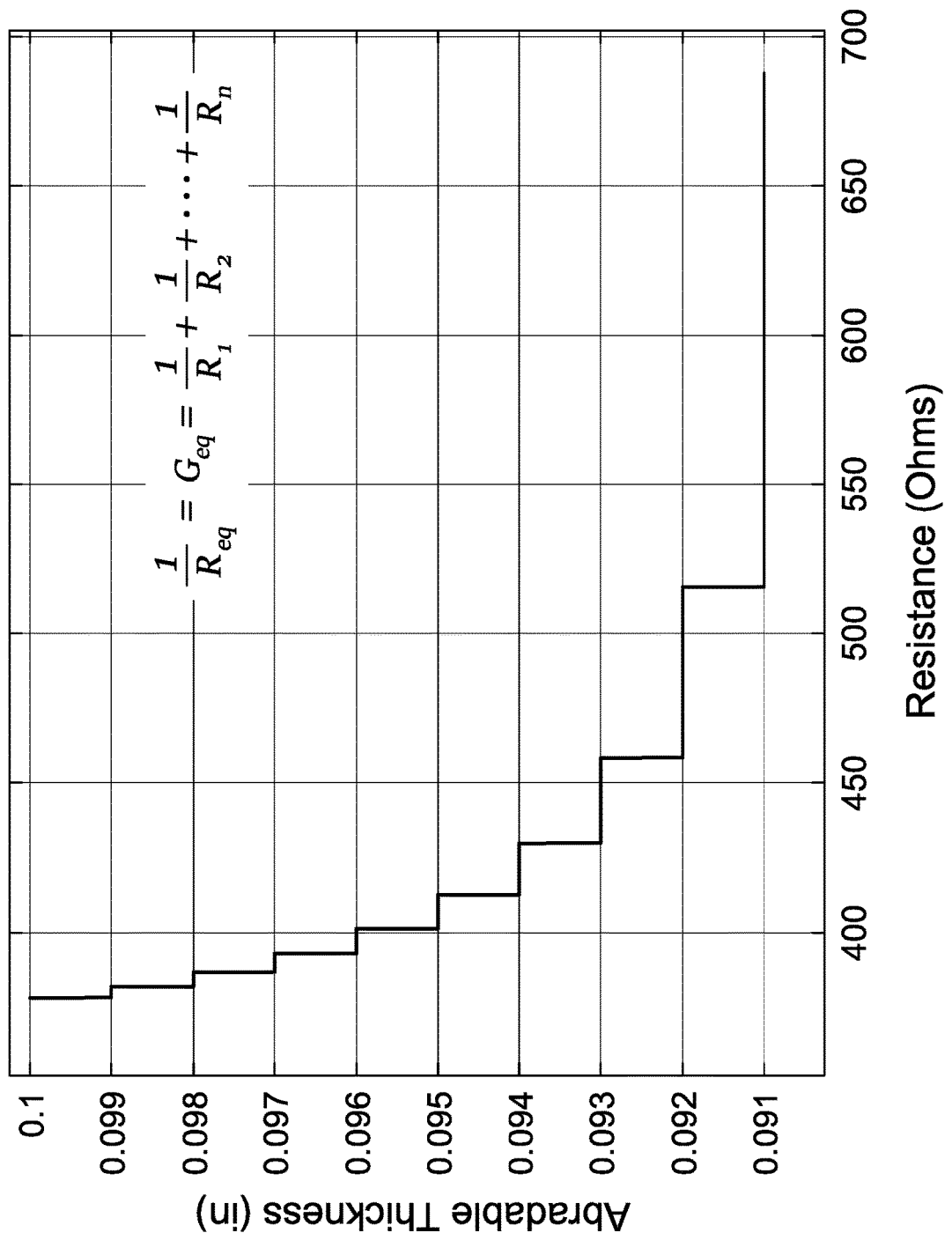
FIG. 5 depicts a plot showing the relationship between abradable sensor wear and the equivalent resistance of the parallel resistive loops.

FIG. 5 shows this relationship between equivalent resistance and abradable sensor thickness 42. In this plot, it shows that each parallel resistive loop 46 was positioned in increments of about 0.001 inches (about 0.0254 millimeters) from the end of the abradable sensor 26. As the abradable sensor 26 wears, parallel resistive loops 46 are disconnected. The change in resistance is larger as fewer resistive loops 46 remain. This can be observed mathematically from equation 1 of parallel resistors above.

In some embodiments, the incremental changes (Δy) in abradable thickness 42 of the position of the resistive loops 46 can vary according to the need for detection. For example, if a certain region of the abradable thickness 42 is determined to be more important than the others, this region may have a finer spacing between the parallel resistive loops 46 than is used in other regions.

Figure 6:
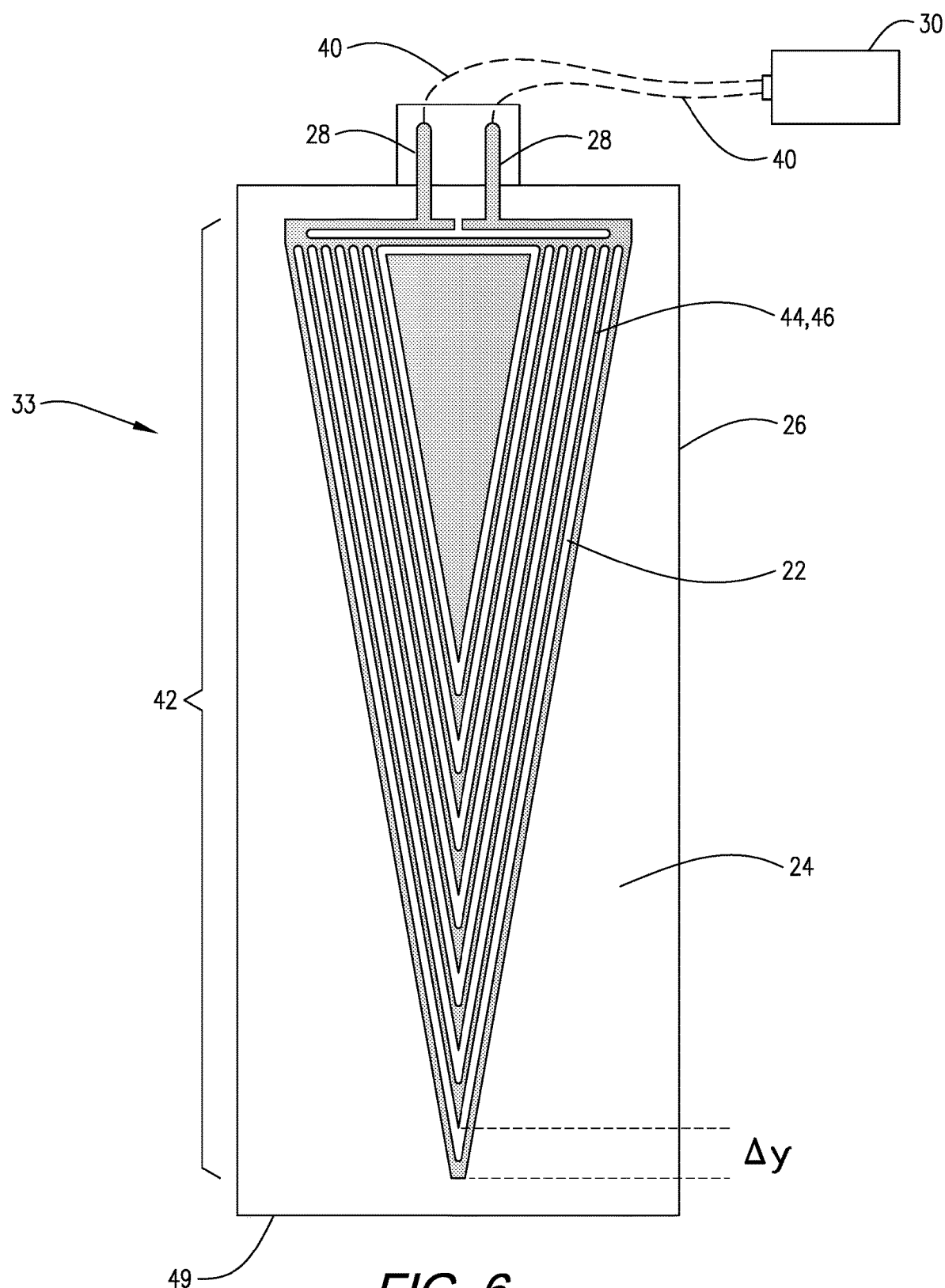
FIG. 6 illustrates an abradable sensor embodiment with an abradable resistive loop consisting of a pattern of concentric triangles forming parallel resistors on a single layer.

Referring to FIG. 6, a single electrically conductive abradable layer 22 is illustrated in a pattern 44. It is noted that various patterns can be incorporated to make up the abradable sensor 26. For example, concentric squares or triangles as shown in FIG. 6 could also be used. Additionally, the pattern 44 does not have to be flat, it could also be three dimensional such as a pattern 44 wrapped around a cylinder or cube. In this embodiment, each triangle forms a parallel resistive loop that is combined to form an equivalent resistance as shown in FIG. 5. However, pattern 44 may be in any shape that allows for electrically conductive layer(s) 22 to be divided into multiple parallel resistive loops or elements.

As the abradable sensor 26 must withstand very harsh environmental conditions and temperature extremes, the materials and manufacturing of the abradable sensor 26 becomes important. Some exemplary materials and manufacturing techniques are listed here.

In one non-limiting example, the abradable sensor 26 is made of one or more layers of electrically conductive abradable layers 22 on a non-electrically conductive abradable substrate 24 or layer 24. The electrically conductive abradable layers 22 could be thin or thick films of nickel, platinum, nichrome, tantalum nitride, or platinum-tungsten for example. Thin film layers typically have layer thickness on the order of about 0.1 microns and thick film layers typically have thickness of about 100 microns thick. Each of these materials have adequate melting points above an operating temperature where the abradable sensor 26 is to operate and these materials have good high temperature corrosion/oxidation resistance. In a thin layer, these materials can also be abradable by the blade tip 16.

In another non-limiting example, thicker electrically conductive abradable layer(s) 22 may be made of a traditional metal matrix abradable coating material such as MCrAlY (Where M can be Ni, Co, Fe or a combination thereof). In this case the thickness of the layer may be on the order of millimeter. These electrically conductive abradable materials are typically porous (about 20-60% porosity) and have at least one lubricating agent such as, but not limited to, boron nitride to give them desirable abradable properties.

As described above, the electrically conductive abradable layers 22 may be comprised of a thin or thick film material selected from the group consisting of nickel, platinum, nichrome, platinum-tungsten, metal matrix abradable coating (MCrAlY), and combinations thereof.

The electrically conductive abradable layers 22 can be added through various coating methods known in the art such as cold spray or gel, thermal spraying (plasma, combustion wire, electric arc, HVOF, etc.), chemical vapor deposition (sputtering), or electroplating. In some applications, methods such as sintering, or heat treating may also be required. Typically, a protective passivation layer, not shown, over electrically conductive abradable layer 22 will protect abradable layer from environmental impact of high temperature corrosion and evaporation due to high temperatures. Materials suitable for forming passivation layers are commercially available from multiple suppliers.

Once a layer of material is applied to the substrate, it can be laser trimmed or etched to the appropriate geometry and pattern. Alternatively, the electrically conductive layers abradable 22 could be printed onto the substrate. Yet another method is to create trenches in the substrate using laser engraving and then apply a layer of electrically conductive abradable material. Where needed, the excess material can be machined, etched, or laser trimmed away.

In a non-limiting example, the non-electrically conductive abradable substrate or layer 24 may be a ceramic matrix-based material. The abradable ceramic matrix substrate is consistent with abradable layers commonly found on gas turbine engines. The substrate is porous and typically has one or more lubricating agents such as boron nitride to provide good abradability properties. For example, the ceramic matrix-based material may be selected from the group consisting of a mullite, silicon carbide, alumina, zirconium-based ceramic, or combinations thereof. These materials typically have a polyester filler that burn off leaving a 25-40% porosity material in some cases. Such materials are commonly used as abradable layers 18 in the hot sections of gas turbine engines.

It is beneficial to have an abradable sensor 26 made from materials with similar environmental and wear properties as the abradable layer 18. As such, the abradable layer 18 and abradable sensor 26 will abrade and/or wear in the same way preventing a potential mismatch between the two that could result in early failure or measurement error. The materials for the abradable sensor 26 may be the same or similar to the materials that are used for the abradable coatings found in gas turbine engines where such coatings are porous and have lubricating agents, as discussed above.

Figure 7:
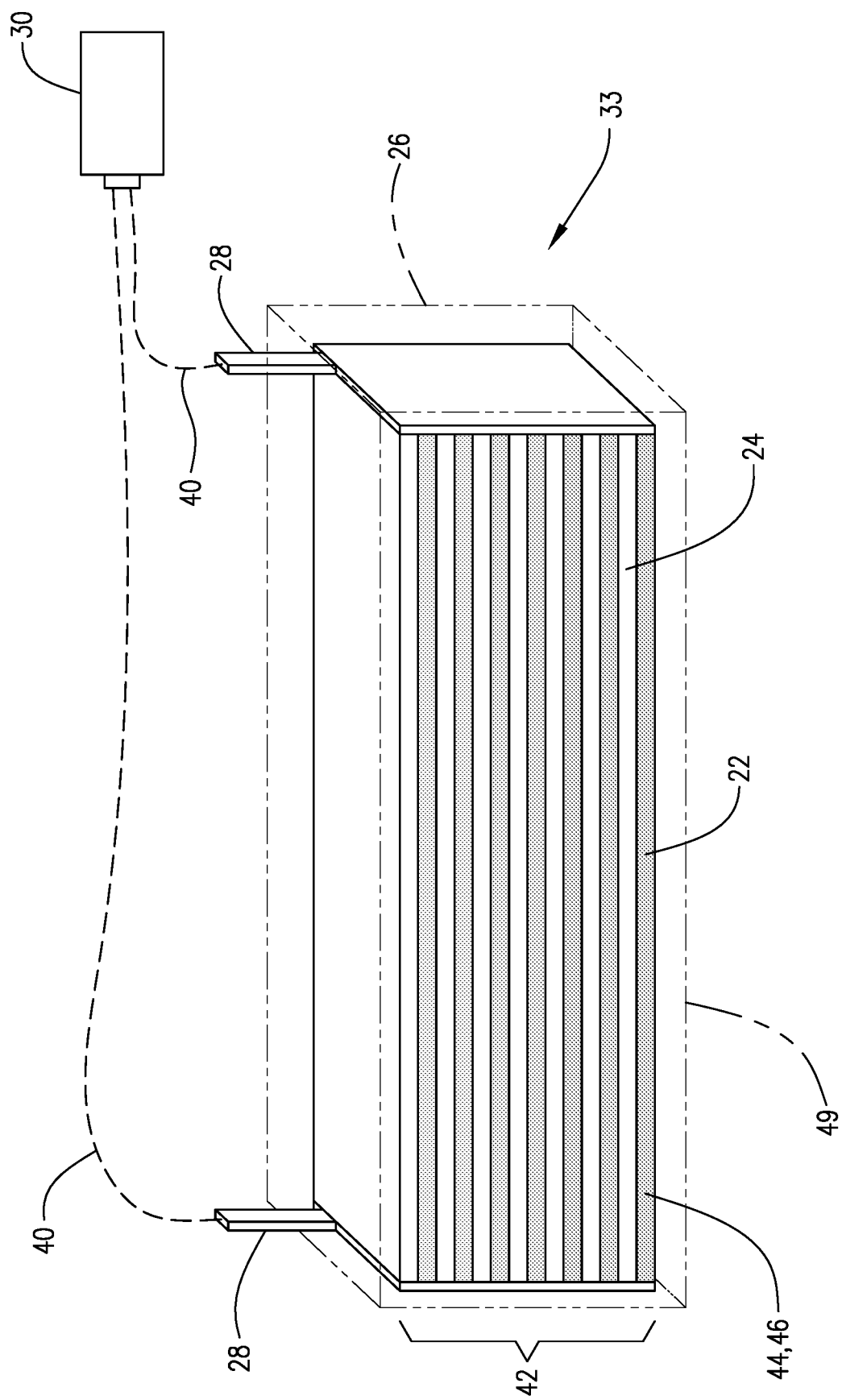
FIG. 7 illustrates an abradable sensor embodiment where the resistive loop is formed through electrically conductive layers electrically tied together for one or more electrically conductive layers.

Referring now to FIG. 7, another embodiment of the invention is shown. Similar in construction and function to the embodiments shown FIGS. 3-6, FIG. 7 shows an abradable sensor 26 that is made of two or more layers of electrically conductive abradable layers 22 and two or more electrically non-conductive abradable substrates 24 or layers 24. These electrically conductive abradable layers 22 are linked together to form parallel resistors as described above. In this case, as the abradable sensor 26 wears, layers of the abradable sensor 26 will wear away and cause the resistance of the abradable sensor 26 to increase similarly to what is shown in FIG. 6. Within the abradable sensor 26, the spacing of the abradable layers 22, 24 is set at deterministic positions to correlate changes in resistance with changes Δy in abradable sensor thickness 42.

Figure 8:
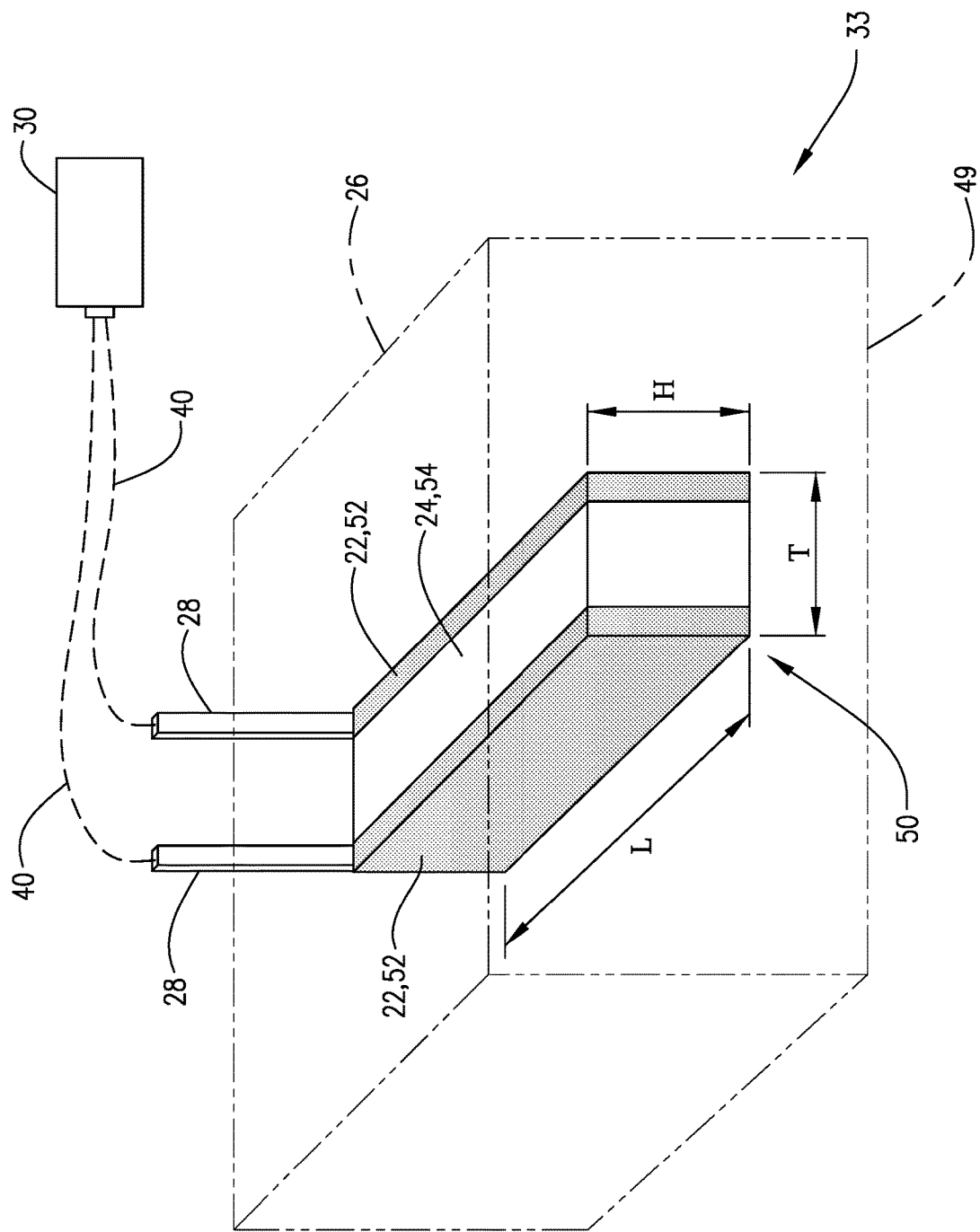
FIG. 8 illustrates an abradable sensor embodiment where a capacitive element is used to detect abradable thickness for one or more electrically conductive layers.

FIG. 8 shows another embodiment of the invention which is similar in construction to the embodiment illustrated in FIG. 7. However, instead of detecting changes in resistance, changes in capacitance are detected. In this case a capacitive element 50 is contained within the abradable sensor 26 instead of resistive layer(s) or loops 46. The capacitive element 50 is formed with two or more abradable electrodes 52 made of an electrically conductive abradable layer 22 similar to those previously described. Between the two or more abradable electrodes 52 is an abradable dielectric material 54. The abradable dielectric material 54 can be a non-electrically conductive abradable substrate 24 or layer 24 such as the substrate previously described. The capacitive element 50 is embedded in non-electrically conductive abradable material which could be the same material as the substrate previously described. Additionally, the two abradable electrodes 52 have electrical contacts 28 which are in electrical communication with the sensor conditioning unit 30.

The two abradable electrodes 52 can be various shapes such as concentric cylinders, polygon planes, or rectangular planes. The shape factor of the capacitive element 50 can be made to amplify the change in capacitance as the capacitive element 50 abrades. The shape factor of the at least two abradable electrodes 52 is related to the gap between electrodes 52, the length vs height, or diameter vs height of the electrodes 52.

Equation 2 below shows the basic equation for capacitance. The capacitance is proportional to the dielectric permittivity ($\varepsilon_0 \varepsilon_r$), the height (h), and length (l) of the capacitive element 50 and inversely proportional to the distance (t) between the two abradable electrodes 52.

$$C = \frac{\varepsilon_0 \varepsilon_r h l}{t} \qquad \text{Eq. 2}$$

Since capacitance (C) is proportional to the electrode height, if all the other parameters remain roughly constant, the capacitance will decrease as the height (h) of the abradable sensor 26 decreases due to wear.

Figure 9:
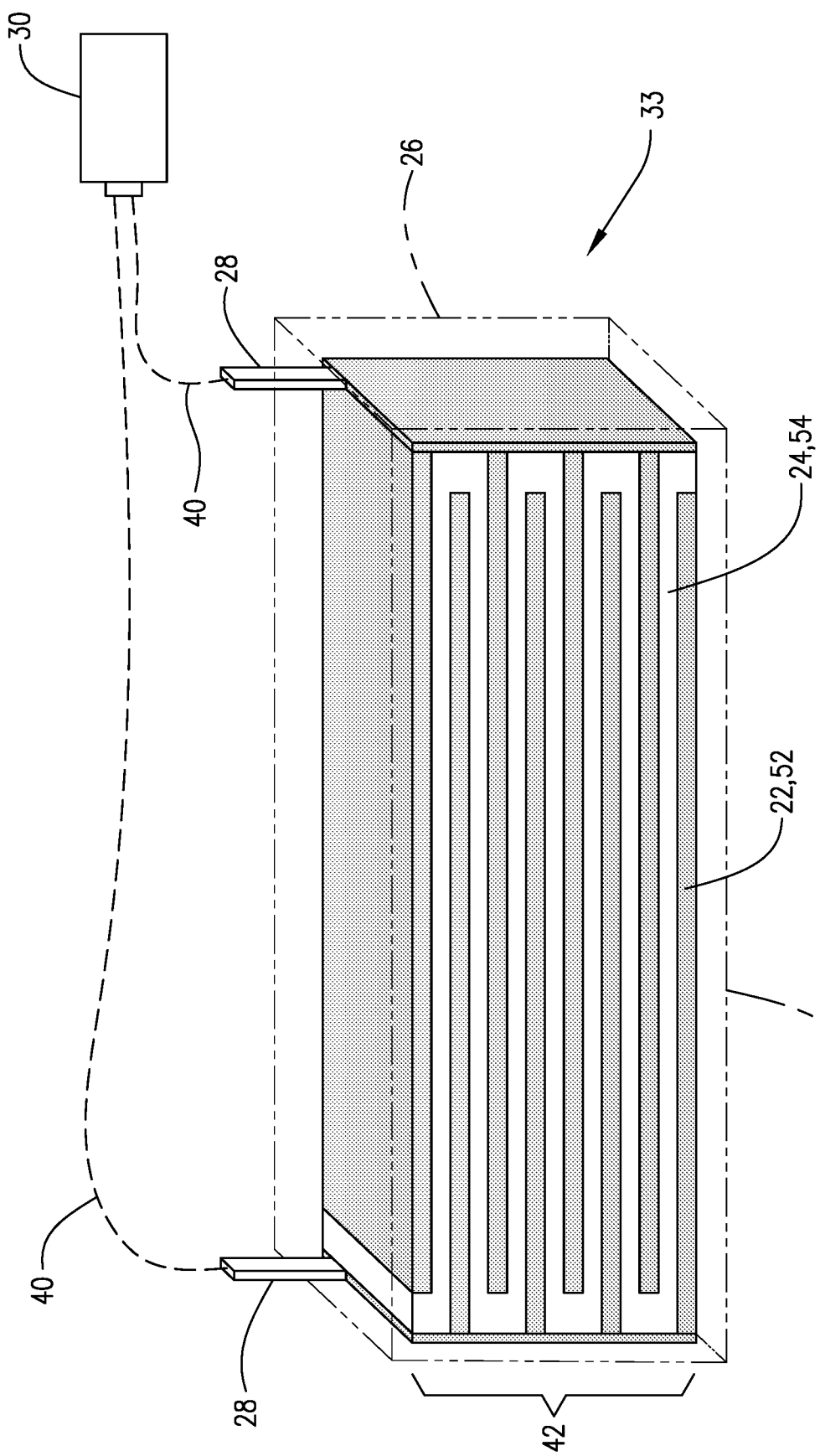
FIG. 9 illustrates an abradable sensor embodiment where the capacitive element is formed through alternating electrically conductive and non-conductive layers for one or more electrically conductive layers.

FIG. 9 shows an alternate embodiment with a capacitive element 50. In this case the capacitive element 50 has multiple layers of alternating electrically conductive abradable layers 22 and non-electrically conductive abradable substrates 24 or layers 24. In this embodiment, as the layers of the abradable sensor 26 wear, this will change the capacitance in discrete steps similar to the layered parallel resistor embodiment. In this case, the equivalent capacitance $C_{eq}$ is the sum of the capacitance of each remaining layer 22, 24.

The capacitance is measured with the sensor conditioning unit 30 which can provide alternating current to the capacitive element 50. The sensor conditioning unit 30 reads the voltage across the abradable sensor 26 which is inversely proportional to the capacitance. Various techniques such as an AC bridge, capacitance to frequency conversion, or capacitance to phase angle conversion can be used to identify small changes in capacitance, such as resolution in the nanofarad capacitance range.

As the operating temperature of the abradable sensor 26 can change significantly over the operation cycle of the gas turbine engine, this can have an effect on the electrical properties that are being measured. Therefore, temperature should be accounted for. This can be done by measured temperature locally with an embedded temperature sensor or having a temperature estimate based on the operating condition or provided from the engine control computer (not shown). See FIGS. 14A and 18.

The temperature sensor can be positioned to measure or approximate the temperature of the abradable sensor 26 which is positioned in the abradable layer 18. The temperature sensor may also be built into the at least one electrically conductive layers of the sensor 26. For example, two different high temperature metallic materials such as tungsten/tungsten-rhenium or platinum/platinum rhodium could be joined at desired location(s) to form thermocouple junction(s) in the abradable sensor.

Figure 10:
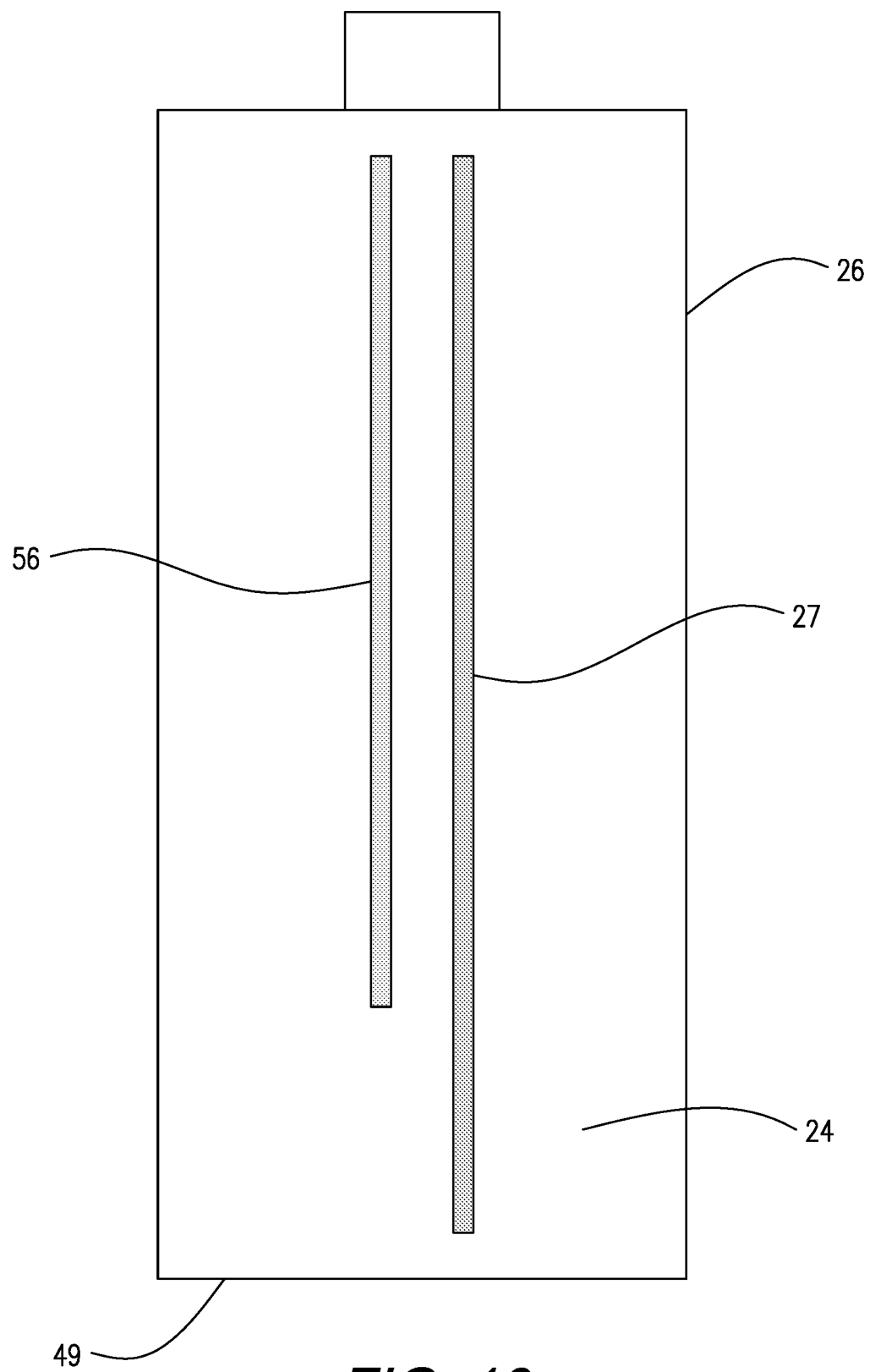
FIG. 10 illustrates a cross-section view of a sensor and a temperature reference or compensating element.
Figure 11:
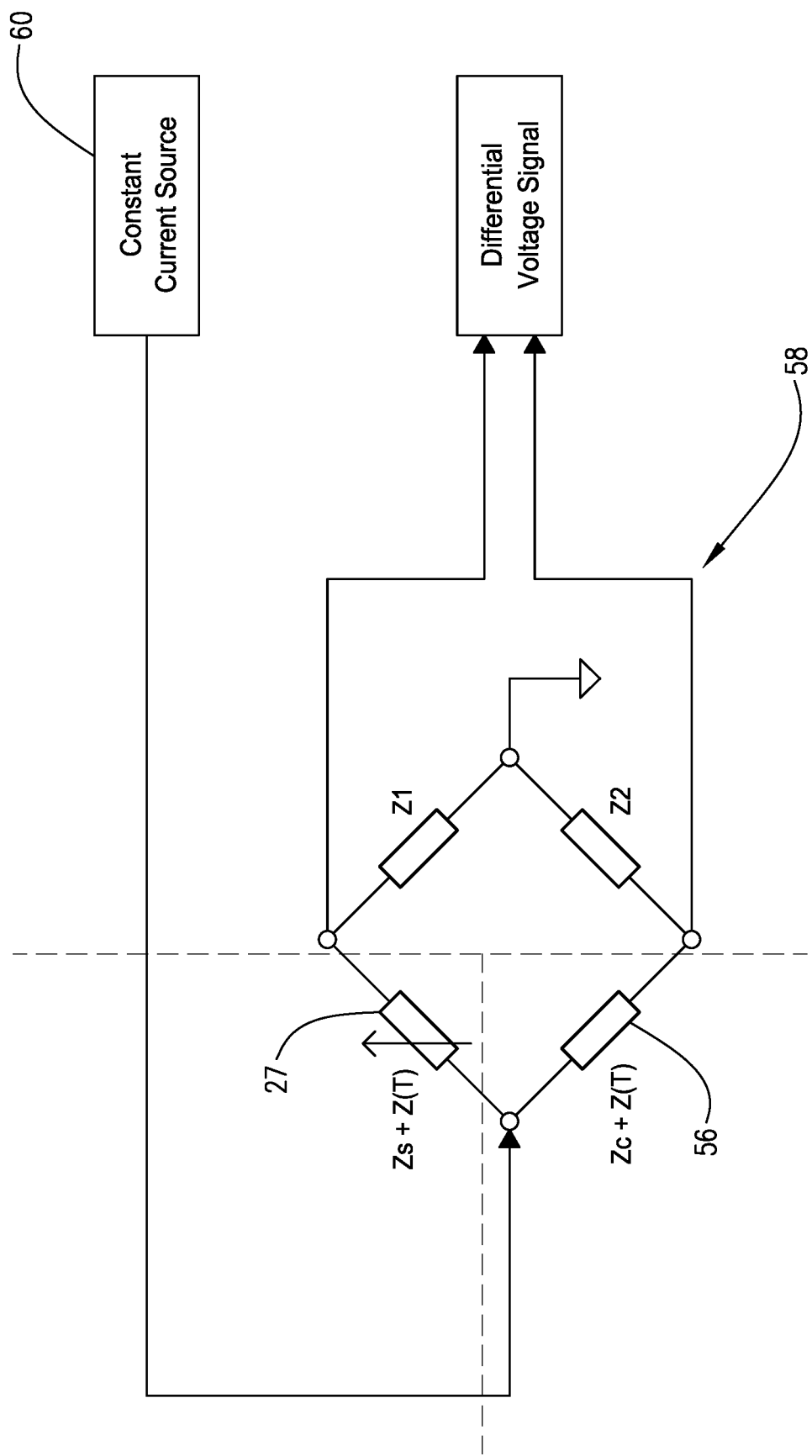
FIG. 11 illustrates a half bridge sensor conditioning configuration that is insensitive to temperature effects.
Figure 12:
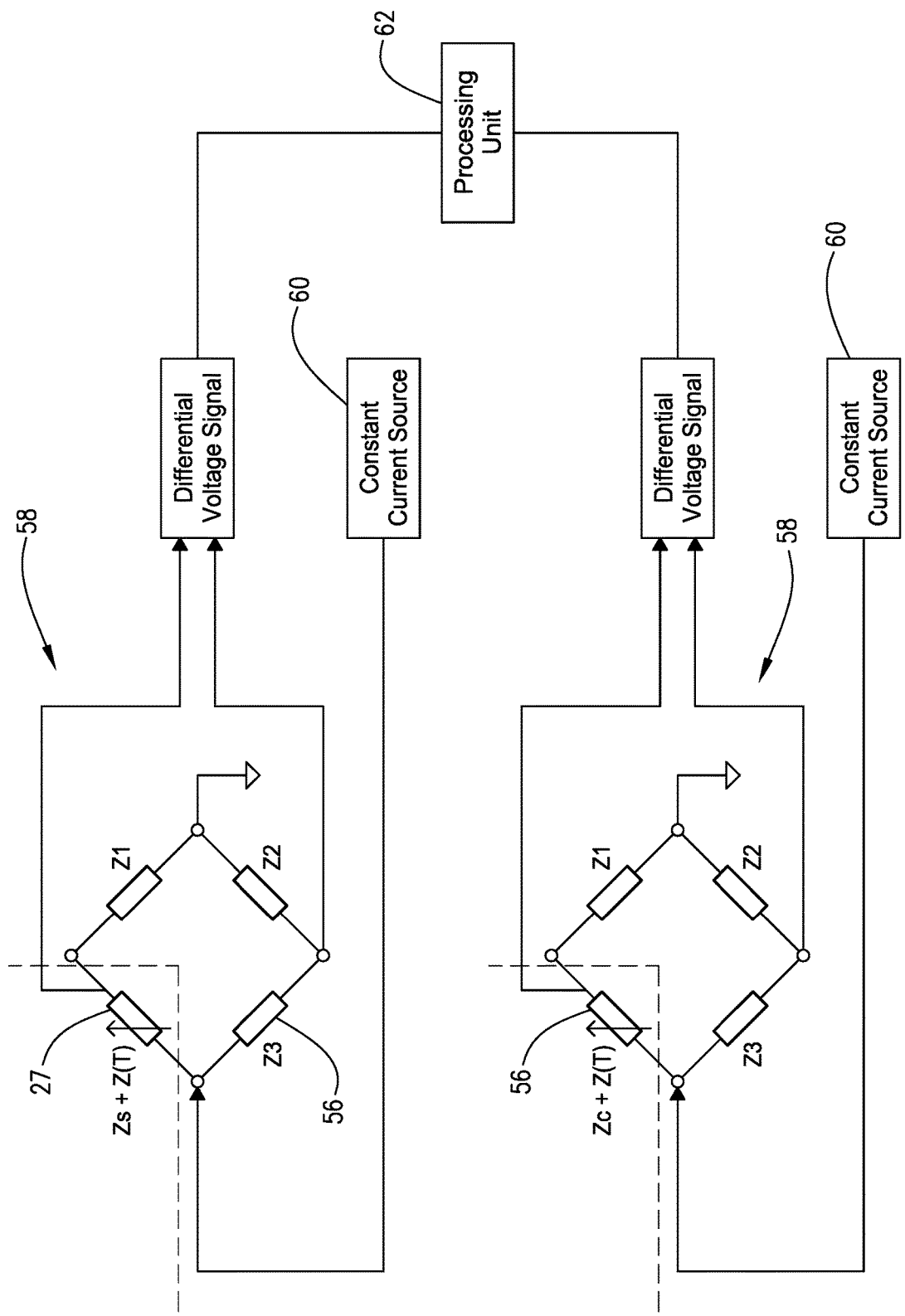
FIG. 12 illustrates a dual quarter bridge sensor conditioning configuration that is used in conjunction with a processing unit for compensating temperature effects.

An alternate approach for temperature compensation is shown in FIGS. 10-12. FIG. 10 shows at least one optional electrically conductive non-abrading reference sensor element 56 and at least one electrically conductive abradable sensor element 27. The sensing element is formed by at least one electrically conductive abradable layer 22 and at least one non-electrically conductive abradable substrate 24 or layer 24. The reference sensor element 56 has similar electrical properties as the abradable sensor element 27. The reference sensor element 56 would be positioned proximate to the abradable sensor element 27 so that it is in or proximate the same thermal environmental. However, the reference sensor element 56 is typically outside the wear path and its electrical properties should remain the same other than temperature effects. The electrically conductive reference sensor element 56 is capable of compensating for temperature effects and variations in a cable impedance, the electrically conductive reference sensor being outside of an abradable wear path of the abradable sensor.

Figure 18:
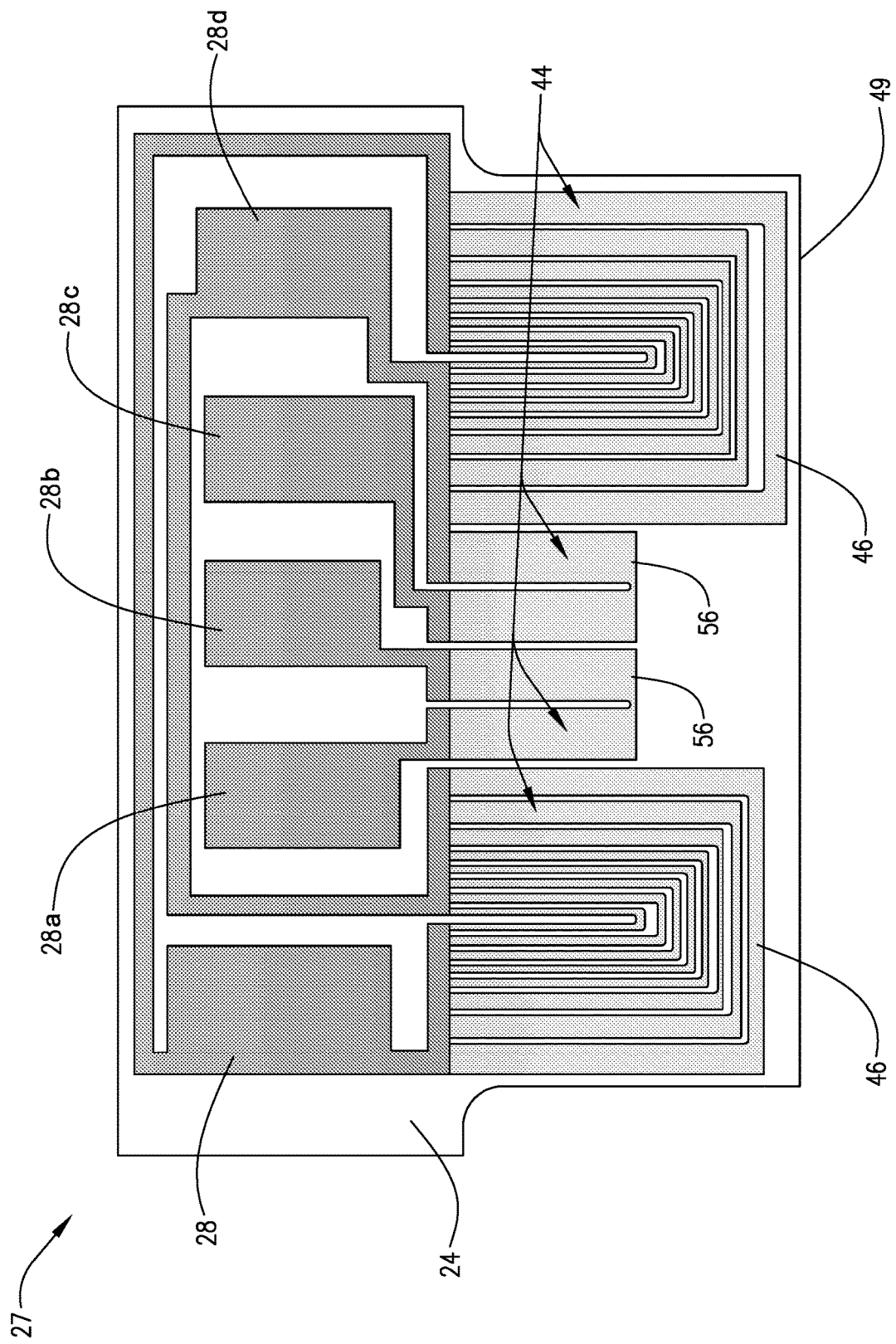
FIG. 18 schematically depicts a sensor with an included temperature sensor element.

An alternate approach is to incorporate the temperature compensating element 56 in the same layer as the electrically conductive abradable layer 22. This is shown in FIG. 18. Sensor element 27 consists of a non-electrically conductive abradable substrate 24, and an electrically conductive resistive pattern 44. Resistive pattern 44 consists of abradable resistive loops 46 and reference sensor elements 56. This embodiment shows two versions of reference sensor element 56. Reference sensor element 56, on the left, between electrical contacts 28a and 28b is a resistive temperature detector (RTD) element. This type of compensating element is shown schematically in FIG. 12. Reference sensor element 56, on the right, between electrical contacts 28c and 28d, is a temperature compensating resistor that can be connected in a wheat stone bridge configuration shown schematically in FIG. 11. Either or both forms of temperature compensation can be used and is described in more detail below.

FIG. 11 shows a half bridge sensor configuration where the abradable sensor element 27 (Zs+Z(T)) and the temperature compensating reference sensor element 56 (Zc+Z(T)) form half of a Wheatstone bridge 58. These elements are located at the sensor. The other two bridge completion elements are in the sensor conditioning unit 30 (Z1 and Z2). The symbol Z in the diagram refers to the electrical impedance of the sensor element and corresponding cables 40. As illustrated, Zs is the nominal impedance of the sensing element and cabling, Zc is the nominal impedance of the compensating or reference sensor element and cabling, Z(T) is the temperature effects on the impedance, and Z1 and Z2 are the electrical impedances of the completion components in the sensor conditioning unit.

To measure the electrical impedance of the Wheatstone bridge, a constant DC or AC current source 60 is applied to the node between the sensor element 27 (Zs+Z(T)) and the temperature compensating element 56 (Zc+Z(T)). A differential voltage measurement is taken at the two nodes shown after the sensor element 27 (Zs+Z(T)) and reference element 56 (Zc+Z(T)). By doing this, the temperature effects and variation in cable impedance (resistance or capacitance) mostly cancel out and only the changes in the sensor element 27 (Zs+Z(T)) are measured. Alternatively, a constant voltage source could be applied to the top and bottom nodes of the bridge and the differential voltage could be measured between the left and right sides of the bridge. Another alternative is to use a full bridge configuration at the sensor, where Z2 would be a redundant sensor element 27 (Zs+Z(T)), and Z1 would be a redundant compensating element 56 (Zc+Z(T)). These methods listed above are non-limiting examples for measuring the electrical impedance changes of the sensing element using Wheatstone bridge configurations.

FIG. 12 shows an alternate embodiment, where the sensor element 27 (Zs+Z(T)) and the reference element 56 (Zc+Z(T)) are read in with separate Wheatstone bridges 58. In this case, each measurement is read into a processing unit 62 contained within the sensor conditioning unit 30. The processing unit 62 is able to digitally calibrate out the temperature effects in the sensor element 27 (Zs+Z(T)) by observing the temperature effects of the temperature compensating element 56 (Zc+Z(T)).

For both embodiments shown in FIGS. 11 and 12, if a resistance measurement is required, this will typically be made by filtering and averaging the DC differential voltage to help improve the signal to noise ratio and reduce unwanted effects of electromagnetic interference For a capacitance measurement, the differential AC voltage will typically be demodulated, filtered, and averaged to help improve the signal to noise ratio and reduce unwanted effects of electromagnetic interference.

Figure 13:
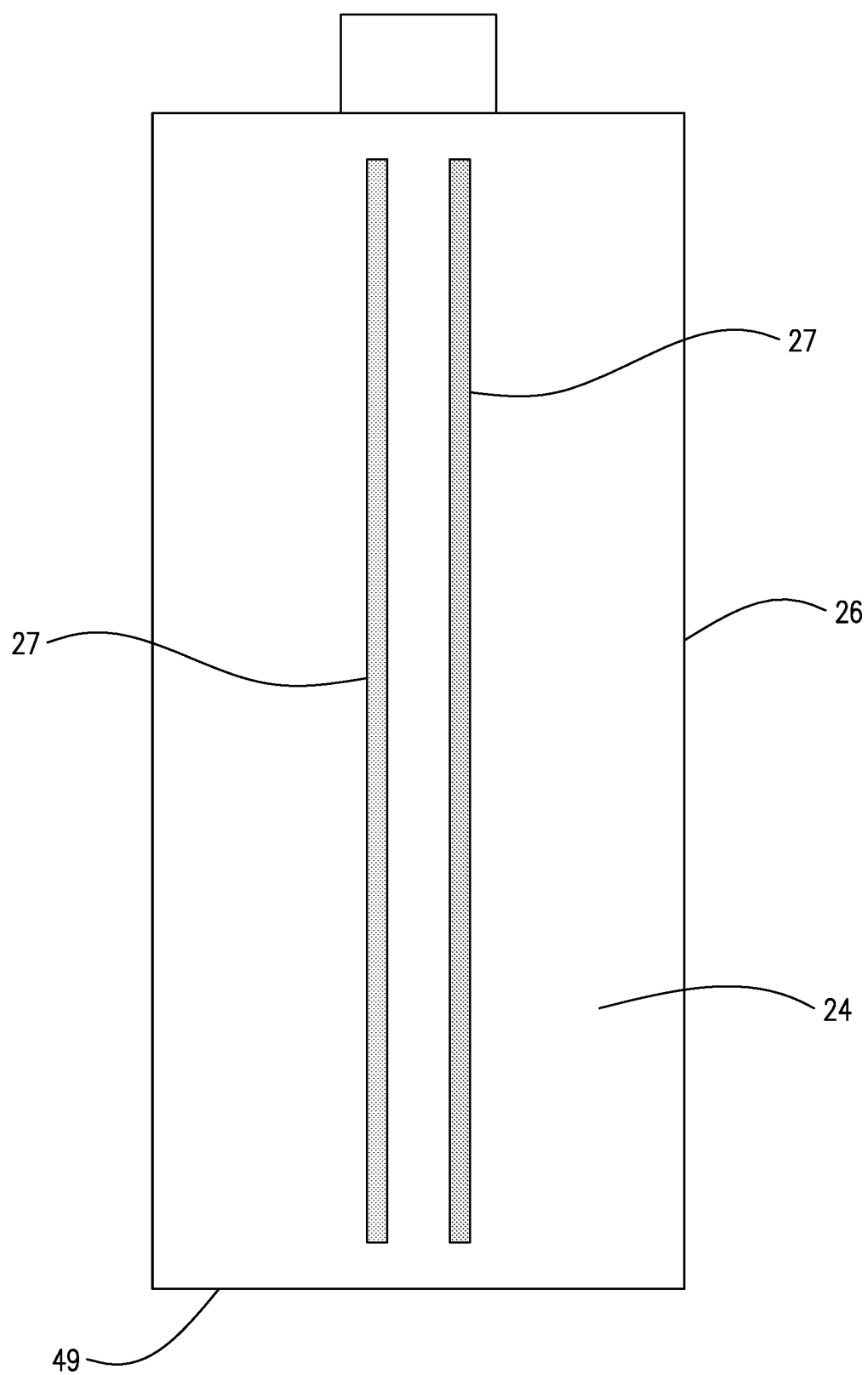
FIG. 13 illustrates a cross-sectional view of a primary sensor and an optional redundant sensor for availability or safety reasons.

FIG. 13 shows a cross sectional view of an embodiment where redundancy can be incorporated for higher availability or for safety considerations. This can be done by putting multiple abradable sensor elements 27 within a single abradable sensor 26 body. Alternatively, multiple abradable sensors 26 could be installed to monitor the abradable wear of a given section of the engine casing 12 and abradable layer 18.

Figure 14B:
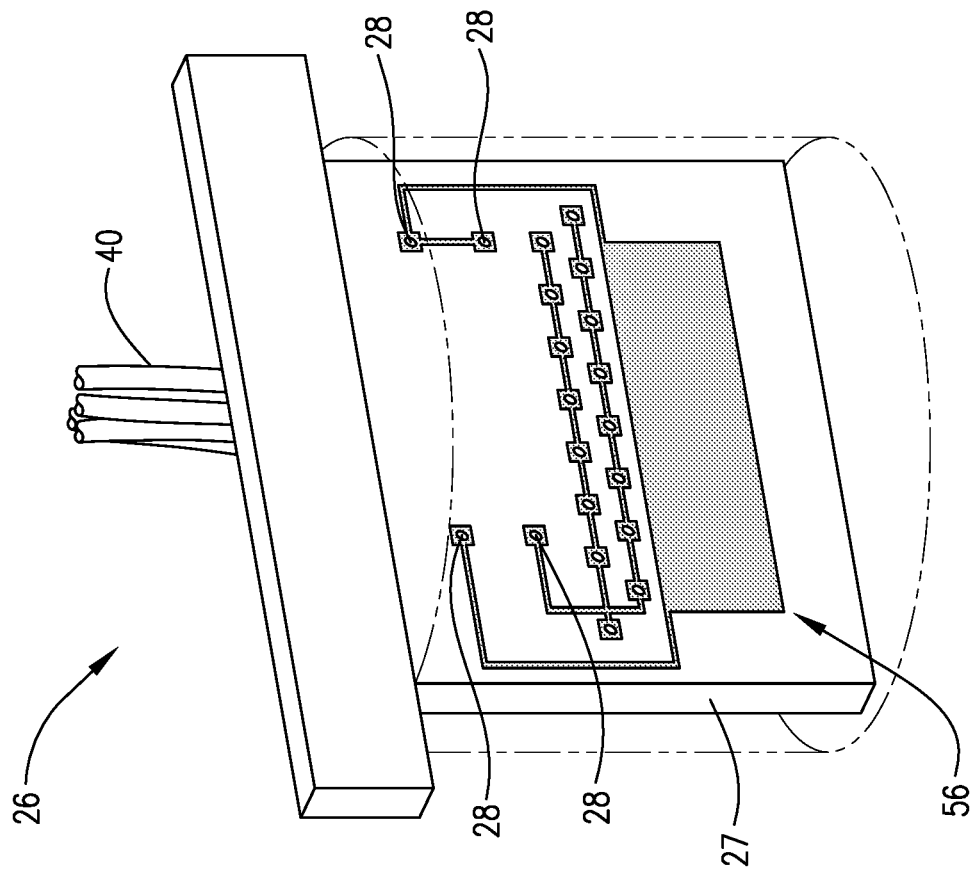
FIGS. 14A and 14B illustrate a front and back perspective view an exemplary sensor design.
Figure 14A:
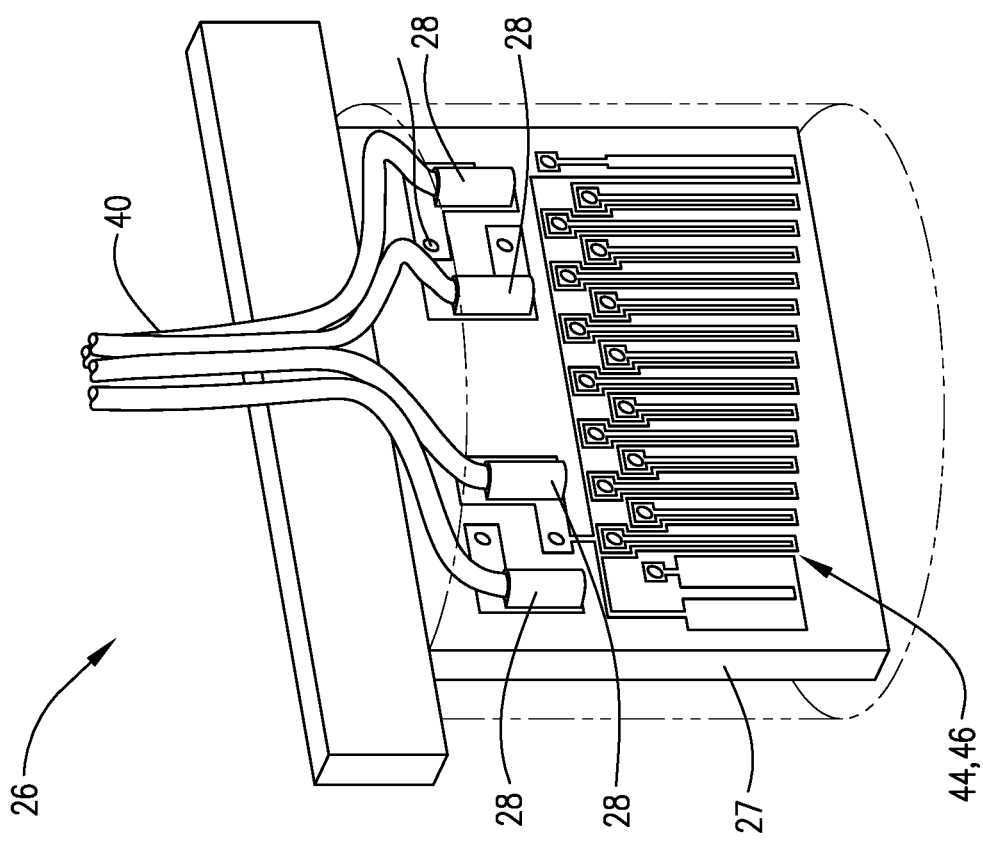

Referring to FIGS. 14A and 14B, an exemplary sensor design where there is an abradable sensor element 27 encased in a protective layer. Where the protective layer is non-electrically conductive and abradable. The sensor element 27 is formed from a non-electrically conductive abradable substrate or layer 24 with an electrically conductive pattern 44 on the front and back side.

The exemplary pattern 44 shown in FIGS. 14A and 14B provides parallel resistive loops 46. As the sensor element 27 abrades during the operation of the engine, the parallel resistive loops 46 will open causing the resistance to increase as previously described. The unique features of this embodiment lie in pattern 44 of the sensor element 27.

Figure 15:
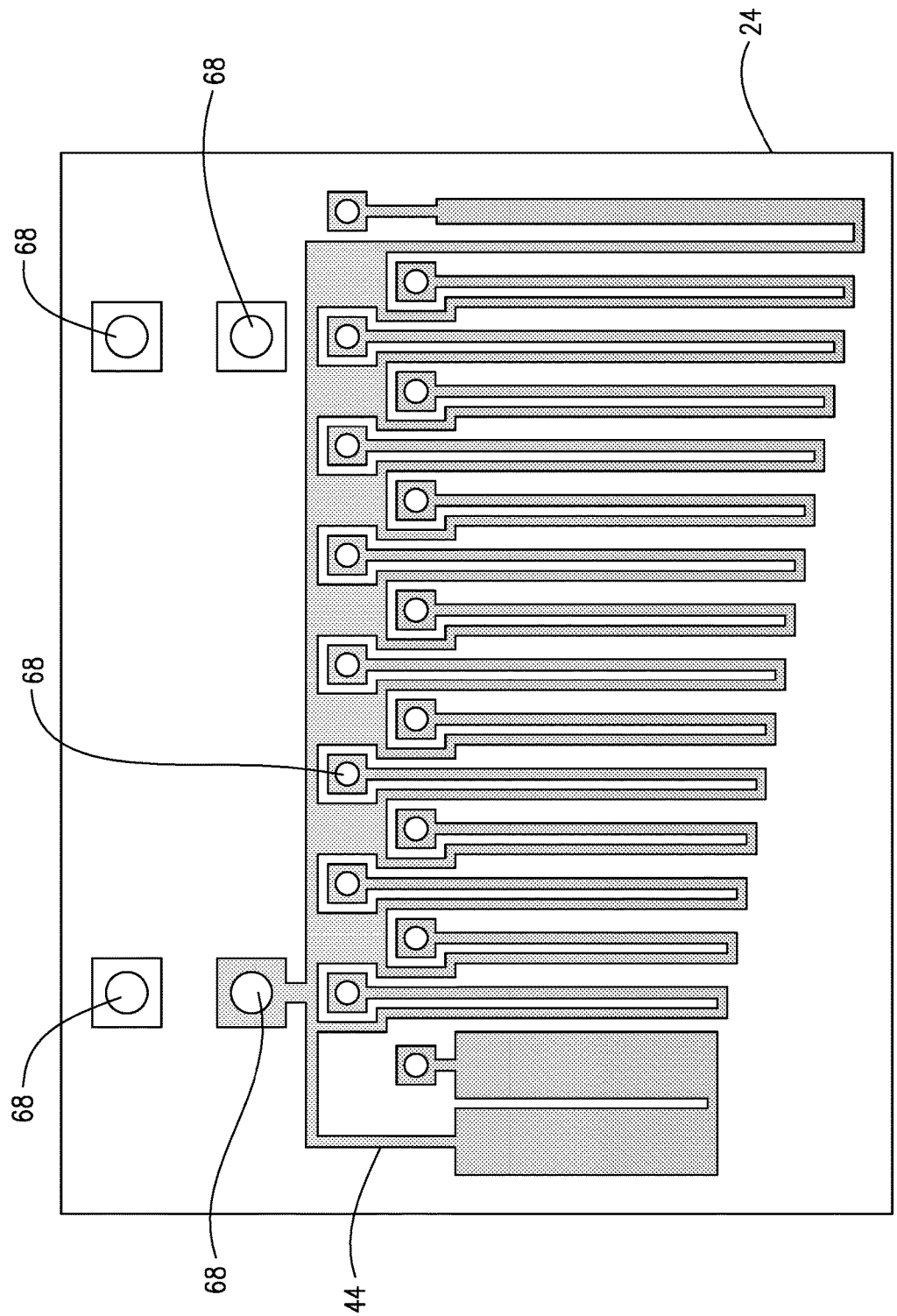
FIG. 15 schematically illustrates the abradable sensor resistive elements from the exemplary sensor in FIG. 14A.

Referring to FIG. 15, a close-up view of FIG. 14A, a non-limiting example of sixteen (16) resistive loops 46 made from a thin film metal deposit are illustrated. Each resistive loop 46 consists of a conductive abradable resistive loop 46 with varying width. By varying the width of the conductive abradable resistive loop 46, the effective resistance can be tailored. As can be seen in FIG. 15, the left most conductive abradable resistive loop 46 is wide providing a low resistance. The conductive resistive loops 46 to the right of that one is narrower providing higher resistance. Moving further to the right the conductive abradable resistive loops 46 widen again providing lower resistance. Such a pattern 44 can provide a nice linear relationship between abradable thickness and equivalent resistance of conductive parallel resistive loops 46. This is shown in the FIGS. 16A and 16B.

The conductive resistive loops 46 are connected together and to the electrical contacts 28 through a portion of the pattern 44. This portion of the pattern 44 may have a thin layer of high electrically conductive material. Additional layers may also be placed to aid in soldering or wire bonding.

In FIGS. 14A and 15, the left side of each conductive resistive loop 46 is connected via a pattern 44 with high electrical conductivity on the front side of the substrate 24 or layer 24. The right side of the resistive loops 46 is electrically connected via the pattern 44 with high electrical conductivity on the back side of the substrate. The metalized holes 68 form an electrical connection between the front and back side of the substrate. Using this type of construction, both sides of the substrate can be used to form the resistive pattern 44.

The controlling of the resistance of the resistive loops 46 illustrated in the FIG. 15 is accomplished by controlling the pattern 44 geometry, thickness of the conductive layers, and material properties.

In this embodiment, the conductive resistive loops 46 form the resistive elements and the high electrically conductive material forms the interconnecting pattern 44. Although not shown here, in other embodiments, this could be switched so that the conductive resistive loops 46 are formed from a higher electrically conductive material and the interconnecting pattern 44 is formed with a lower electrically conductive material to create the parallel resistive elements. In this alternate embodiment, the thickness and shape factor of the interconnecting pattern 44 can be tailored to provide a similarly operating abradable sensor element 27 as what is shown in FIG. 15.

Although not shown here, another alternate approach would be to use discrete wire loops. For example, the wires can either act to complete the parallel resistive network or function as resistive elements. One may choose the wire diameter, length, placement, and/or material properties to design a similarly operating abradable sensor element 27 as shown in FIG. 15.

Figure 16A:
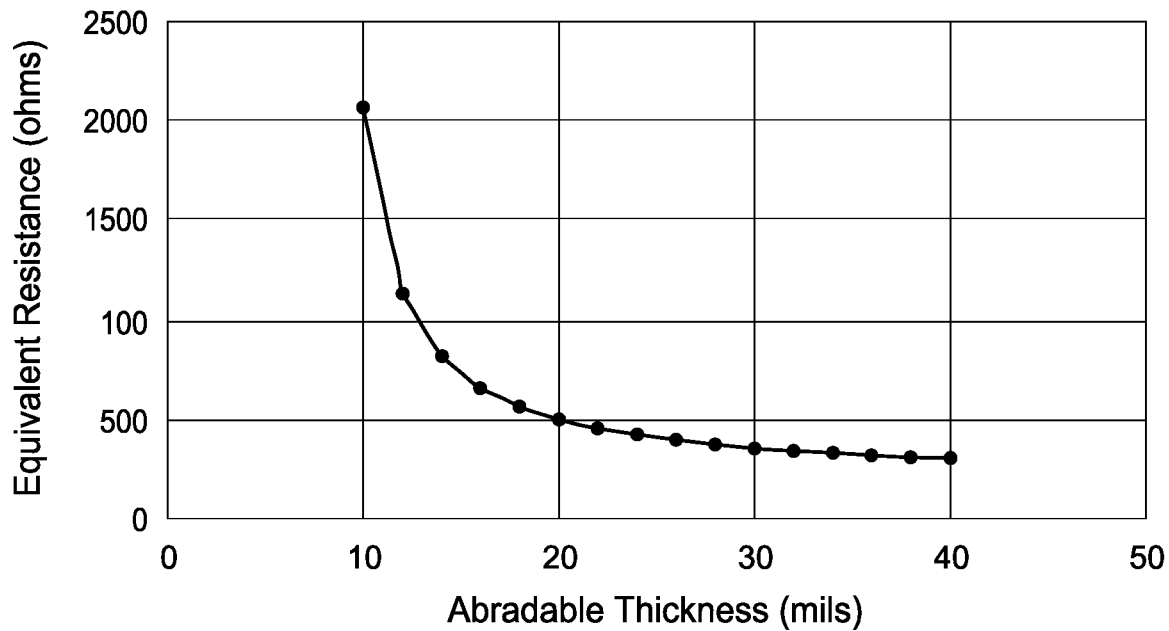
FIG. 16A graphically illustrates an equivalent resistance with respect to the abradable thickness for a sensor element having mostly uniform parallel resistors and some series resistance.

FIG. 16A illustrates a typical equivalent resistance with respect to the abradable thickness for a sensor element 27 that has mostly uniform parallel resistive loops 46 and some series resistance. FIG. 16A is representative of some of the other resistive embodiments shown in this invention.

Figure 16B:
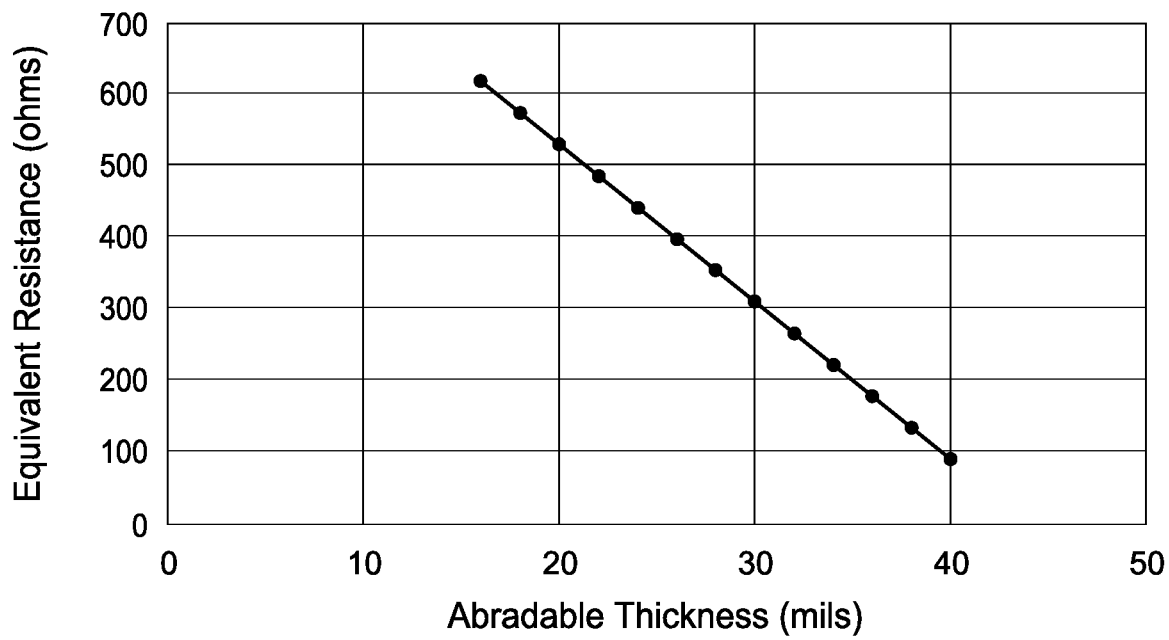
FIG. 16B graphically illustrates an equivalent resistance with respect to the abradable thickness for a sensor element having a variable resistor pattern as illustrated in FIG. 15.

FIG. 16B illustrates the equivalent resistance versus the abradable thickness for a sensor element 27 that has variable resistor pattern 44 as shown FIG. 15. In that configuration, each resistive loop 46 can be tailored by varying the width of each resistive loop 46, the length each resistive loop 46, or both the length and width each resistive loop 46. FIG. 16B illustrates the nice linear relationship that can be achieved. Such a relationship can be expressed with simple gain and offset calibration values.

Figure 17:
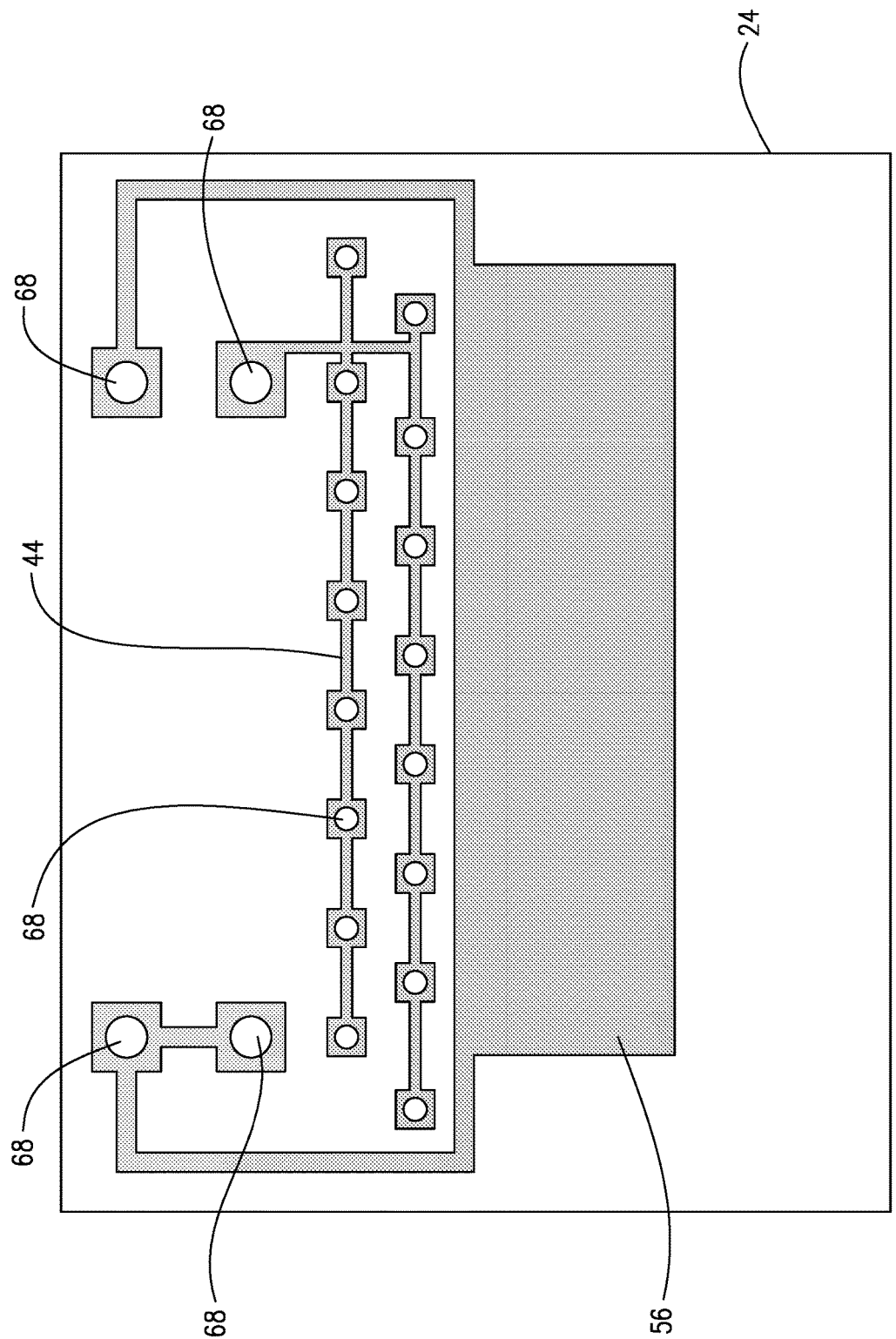
FIG. 17 schematically illustrates the same sensor of FIG. 14B with electrical conductivity is connected through all the holes of the sensor from the front to the back of the sensor and the optional reference resistive element.

FIG. 17 illustrates a zoomed in view of FIG. 14B. In FIG. 17, the back side of the non-electrically conductive abradable substrate or layer 24 has a pattern 44 with high electrical conductivity is connecting all the metalized through holes 68. This approach allows for the completion of the electrical circuit on the front.

Additionally, the back side of the non-electrically conductive abradable substrate or layer 24 has an optional compensating resistor reference element 56. The resistor reference element 56 is configured to complete one-half of a Wheatstone bridge, as the Wheatstone bridges are described above for compensating effects of temperature and cable resistance.

The abradable sensing systems 33 described above using one or more of the abradable sensors 26 described above may be used to detect a blade rub or wear of an abradable layer on a stationary engine casing. Where the sensor conditioning unit 30 is also used, and electrical signals are transmitted between the sensor conditioning unit 30 and the abradable sensor 26. The sensor conditioning unit 30 measures one or more electrical characteristic of the abradable sensor 26 which could be the resistance, the capacitance, and/or the round-trip time of flight for a reflected electrical signal. The sensor conditioning unit 30 correlates one or more of the measured resistances, capacitance, or time of flight for the reflected electrical signal against a known relationship to abradable sensor thickness. The result provides the current thickness of the abradable sensor. Using this information, the sensor conditioning unit is able to detect a rub event or a zero clearance between the blade tip and the stationary engine casing when the resistance, the capacitance, or the round-trip time of flight for a reflected electrical signal significantly changes in a short period of time.

As an example, a rub event could be detected by losing more than one parallel resistive or capacitive element in less than 10 seconds.

For all the described sensor embodiments, the sensor conditioning unit can be capable of periodic or continuous built-in-test of the sensor health. For example, a check can be made that the change in electrical properties does not exceed a pre-determined threshold within a pre-determined amount of time.

Other embodiments of the present invention will be apparent to one skilled in the art. As such, the foregoing description merely enables and describes the general uses and methods of the present invention. Accordingly, the following claims define the true scope of the present invention.

What is claimed is:

1. A sensing system for detecting a rub or wear of an abradable layer on a stationary engine casing, theسensing system comprising:
   an abradable sensor embedded in the abradable layer, wherein the sensor abrades when contacted by a blade tip or erodes due to at least one environmental condition, the abradable sensor comprises:
   at least one electrically conductive abradable resistive layer, the electrically conductive abradable resistive layer includes a plurality of electrically conductive resistive loops or meandering traces defining a single continuous circuit having a distinct pattern;

at least one non-electrically conductive abradable layer,
wherein the at least one electrically conductive abradable resistive layer and the at least one non-electrically conductive abradable layer form an abradable sensor element, the abradable sensor element includes at least one electrically conductive non-abrading reference element;
wherein the abradable sensor element and the electrically conductive non-abrading reference element of the abradable sensor comprises a first half of a Wheatstone bridge and wherein a second half of a Wheatstone bridge is formed in a sensor conditioning unit; and,
at least one pair of electrical leads capable of providing an electrical signal to and from the abradable sensor.

2. The sensing system of claim 1, wherein the electrically conductive non-abrading reference element has electrical properties corresponding to the abradable sensor element; and, the electrically conductive non-abrading reference element is capable of compensating for temperature effects and variations in a cable impedance and is located outside of an abradable wear path of the abradable sensor element.

3. The sensing system of claim 1, wherein the electrically conductive non-abrading reference element is positioned in a same thermal environment as the abradable sensor element.

4. The sensing system of claim 1, further comprising a temperature sensor positioned to measure a temperature of the stationary engine casing.

5. The sensing system of claim 1, wherein the plurality of electrically conductive resistive loops are parallel electrically conductive resistive loops and the parallel electrically conductive resistive loops are positioned closer together in at least one region of the abradable sensor than at least one other region of the abradable sensor.

6. The sensing system of claim 1, further comprising at least one additional abradable sensor.

7. The sensing system of claim 1, wherein the abradable sensor is capable of detecting a rub event between the rotating turbine or compressor blade and a non-rotating abradable layer on a section of a stationary engine casing in which the rotating turbine or compressor blade are operating.

8. The sensing system of claim 1, wherein the electrically conductive abradable layer is a metal matrix having a porosity of between 35% and 60% and includes at least one lubricating agent.

9. The sensing system of claim 1, wherein the non-electrically abradable conductive layer has a porosity between 25% and 40% and further comprises at least one lubricating agent.

10. A method of detecting a rub or wear of an abradable layer on a stationary engine casing, the method comprising:
providing a sensing system, wherein the sensing system comprises:
an abradable sensor embedded in the abradable layer, wherein the abradable sensor abrades when contacted by a blade tip or erodes due to at least one environmental condition, the abradable sensor includes:
at least one electrically conductive abradable resistive layer, the electrically conductive abradable resistive layer includes a plurality of electrically conductive resistive loops or meandering traces defining a single continuous circuit having a distinct pattern;
at least one non-electrically conductive abradable layer;
wherein the at least one electrically conductive abradable resistive layer and the at least one non-electrically conductive abradable layer form an abradable sensor element, the abradable sensor element includes at least one electrically conductive non-abrading reference element;
wherein abradable sensor element and the electrically conductive non-abrading reference element of the abradable sensor comprises a first half of a Wheatstone bridge and wherein a second half of a Wheatstone bridge is formed in a sensor conditioning unit; and,
at least one pair of electrical leads capable of providing an electrical signal to and from the abradable sensor;
a sensor conditioning unit in electrical communication with the abradable sensor;
transmitting electrical signals between the sensor conditioning unit and the abradable sensor;
measuring at least one of a resistance, a capacitance, or a round-trip time of flight for a reflected electrical signal; and
correlating the measured resistance, capacitance, or time of flight for the reflected electrical signal against a known relationship to abradable thickness.

11. The method of claim 10, further comprising detecting a rub event or a zero clearance between the blade tip and the stationary engine casing when the resistance, the capacitance, or the round-trip time of flight for a reflected electrical signal significantly changes.

12. A sensing system for detecting a rub or wear of an abradable layer on a stationary engine casing, the sensing system comprising:
an abradable sensor embedded in the abradable layer, wherein the sensor abrades when contacted by a blade tip or erodes due to at least one environmental condition, the abradable sensor comprises:
at least one electrically conductive abradable resistive layer, the electrically conductive abradable resistive layer includes a plurality of electrically conductive resistive loops or meandering traces defining a single continuous circuit having a distinct pattern;
at least one non-electrically conductive abradable layer,
at least one pair of electrical leads capable of providing an electrical signal to and from the abradable sensor;
wherein the configuration of the abradable sensor results in the abradable sensor undergoing an increase in electrical resistance as the abradable sensor undergoes abrasive wear resulting in the removal of at least one electrically conductive resistive loop or meandering trace of the single continuous circuit having a distinct pattern; and,
wherein the electrically conductive abradable layer is a metal matrix having a porosity of between 35% and 60% and includes at least one lubricating agent.

13. The sensing system of claim 12, wherein the abradable sensor element includes at least one electrically conductive non-abrading reference element.

14. The sensing system of claim 12, wherein the electrically conductive non-abrading reference element has electrical properties corresponding to the abradable sensor element; and, the electrically conductive non-abrading reference element is capable of compensating for temperature effects and variations in a cable impedance and is located outside of an abradable wear path of the abradable sensor element.

15. The sensing system of claim 12, further comprising a temperature sensor positioned to measure a temperature of the stationary engine casing.

\* \* \* \* \*